United States Patent
Togino

(10) Patent No.: US 7,542,218 B2
(45) Date of Patent: Jun. 2, 2009

(54) OPTICAL SYSTEM

(75) Inventor: Takayoshi Togino, Koganei (JP)

(73) Assignee: Olympus Corporation, Tokyo (JP)

( * ) Notice: Subject to any disclaimer, the term of this patent is extended or adjusted under 35 U.S.C. 154(b) by 244 days.

(21) Appl. No.: 11/434,751

(22) Filed: May 17, 2006

(65) Prior Publication Data

US 2008/0151380 A1    Jun. 26, 2008

(30) Foreign Application Priority Data

May 26, 2005    (JP) .............................. 2005-153760

(51) Int. Cl.
*G02B 31/06*    (2006.01)
*H04N 7/00*    (2006.01)
(52) U.S. Cl. ........................................ 359/725; 348/36
(58) Field of Classification Search ............... 348/36; 359/725
See application file for complete search history.

(56) References Cited

U.S. PATENT DOCUMENTS 6,356,296 B1 *    3/2002    Driscoll et al. .............. 348/36

7,463,431 B2 *    12/2008    Togino et al. ............... 359/725

FOREIGN PATENT DOCUMENTS

JP    2001-174713    6/2001
JP    2004-287435    10/2004

* cited by examiner

*Primary Examiner*—David N Spector
(74) *Attorney, Agent, or Firm*—Kenyon & Kenyon LLP

(57) ABSTRACT

A curved surface image-conversion optical system is configured to take an image of a hemispherically curved object or project it as a curved surface image, which optical system includes a front unit formed of a transparent medium rotationally symmetric about a center axis and having at least two internal reflecting surfaces and two transmitting surfaces, a rear unit that is rotationally symmetric about the center axis and has positive power, and an aperture located coaxially with the center axis. The front unit includes the first transmitting surface through which a light beam from an object point is incident on the front unit, the first reflecting surface for reflecting the transmitted light beam, the second reflecting surface for reflecting the reflected light beam and the second transmitting surface through which the reflected light leaves the transparent medium.

11 Claims, 13 Drawing Sheets

OPTICAL SYSTEM

RELATED APPLICATIONS

This application claims the benefit of Japanese Application No. 2005-153760 filed in Japan on May 26, 2005, the contents of which are incorporated herein by reference in their entirety.

BACKGROUND OF THE INVENTION

The present invention relates generally to an optical system, and more particularly an objective optical system well fit for all sky cameras or the like adapted to form hemispherical object images on a zonal-form flat image plane and a projection optical system suitable for use with panoramic projectors or the like adapted to project zonal images located on an image plane onto a hemispherically curved surface.

In methods heretofore, when projecting images projected onto a domed screen, a plurality of images projected independently through a plurality of projectors have been put together or projected through a wide-angle optical system such as a fisheye lens.

For instance, Japanese Patent Application Publication No. 2001174713 shows an objective optical system for endoscope applications, in which the first reflecting surface that is rotationally symmetric about the center axis and includes an annular convex surface, and the second reflecting surface including a convex surface, are located in front of an image-formation lens to form a hemispherically curved object on a plane. However, there is nothing specific set forth about the optical system whatsoever.

Further, Japanese Patent Application Publication No. 2004287435 shows that a beam splitter, a concave mirror and a ball lens array are combined together to convert a flat image into a curved image.

SUMMARY OF THE INVENTION

In view of the state of the prior art as described above, the present invention has for its object the provision of a curved surface image-conversion optical system well fit for all sky cameras, panoramic projectors or the like, which is capable of taking hemispherically curved object images or projecting them as hemispherically curved images with simplified construction, and which is of small format size and improved resolving power with well-corrected aberrations.

According to the invention, this object is achieved by the provision of an image formation system adapted to form a hemispherical image on an image plane, or a projection system adapted to project a planar image onto a spherical image surface, which includes a front unit formed of a transparent medium rotationally symmetric about a center axis and including at least two internal reflecting surfaces and two transmitting surfaces, a rear unit that is rotationally symmetric about the center axis and has positive power, and an aperture located coaxially with the center axis. In an order of travel of light rays in the case of the image formation system, or in reverse order of travel of light rays in the case of the projection system, said front unit includes a first transmitting surface through which a light beam from an object point is incident on said front unit, a first reflecting surface for reflecting a light beam after transmission through said first transmitting surface, a second reflecting surface for reflecting a light beam after reflection at said first reflecting surface and a second transmitting surface through which a light beam after reflection at said second reflecting surface leaves said transparent medium. A light beam coming from an object travels through said front unit and said rear unit in this order, forming an annular plane image at a position of the image plane off the center axis.

In this case, it is desired that, in a meridional section, two entrance pupils are symmetrically located with the center axis between them.

In one preferable embodiment of the invention, at least one reflecting surface is of rotationally symmetric shape defined by rotation about the center axis of a line segment of any arbitrary shape having no symmetric plane.

In one preferable embodiment of the invention, at least one reflecting surface is of rotationally symmetric shape defined by rotation about the center axis of a line segment of any arbitrary shape including an odd-number degree term.

In one preferable embodiment of the invention, an entrance pupil in the meridional section and an entrance pupil in a sagittal section differ in position.

In a specific embodiment of the invention, an entrance pupil in the meridional section lies near the first transmitting surface in the optical system, and an entrance pupil in the sagittal section lies near the center axis.

In a preferable embodiment of the invention, the number of stop images formed upon projection of said aperture in an opposite direction to a direction of incidence of said light beam is the same, or differs by one, in the meridional section and the sagittal section.

In an embodiment of the invention, it is preferable that, in the meridional section and near an entrance pupil formed by said front unit on an object side, there is a one-way flare stop located for limiting said aperture in said meridional section alone.

In one embodiment of the invention, it is preferable to satisfy the following condition (1) in the meridional section:

$$-60° < \theta_1 < -20° \qquad (1)$$

where $\theta_1$ is the angle of a tangential plane with respect to the center axis at a position of said first transmitting surface, on which the center ray of a center light beam from the center of an angle of view is incident.

In an embodiment of the invention, it is preferable to satisfy the following condition (2):

$$1.2 < H_1/H_2 \qquad (2)$$

where $H_1$ is the height of said front unit from the top end to the bottom end perpendicularly to the image plane, and $H_2$ is the height from the top end of said front unit to a position of said first transmitting surface, on which the center ray of a center beam from the center of an angle of view is incident.

In an embodiment of the invention, it is preferable to satisfy the following condition (3):

$$5 < |A/B| \qquad (3)$$

where A is an optical path length of a entrance pupil position in a meridional section to a position of said aperture, and B is an optical path length from an entrance pupil position in the meridional section to said first transmitting surface of said front unit.

According to the invention as described above, it is possible to obtain a curved surface-conversion optical system which is capable of taking or projecting hemispherically curved object images with simplified construction, and which is of small format size and improved resolving power with well-corrected aberrations.

Still other objects and advantages of the invention will, in part, be obvious and will, in part, be apparent from the specification.

The invention accordingly includes the features of construction, combinations of elements, and arrangement of parts which will be exemplified in the construction set forth, and the scope of the invention will be indicated in the claims.

DESCRIPTION OF THE PREFERRED EMBODIMENTS

The optical system of the invention is now explained with reference to its embodiments.

Figure 1:
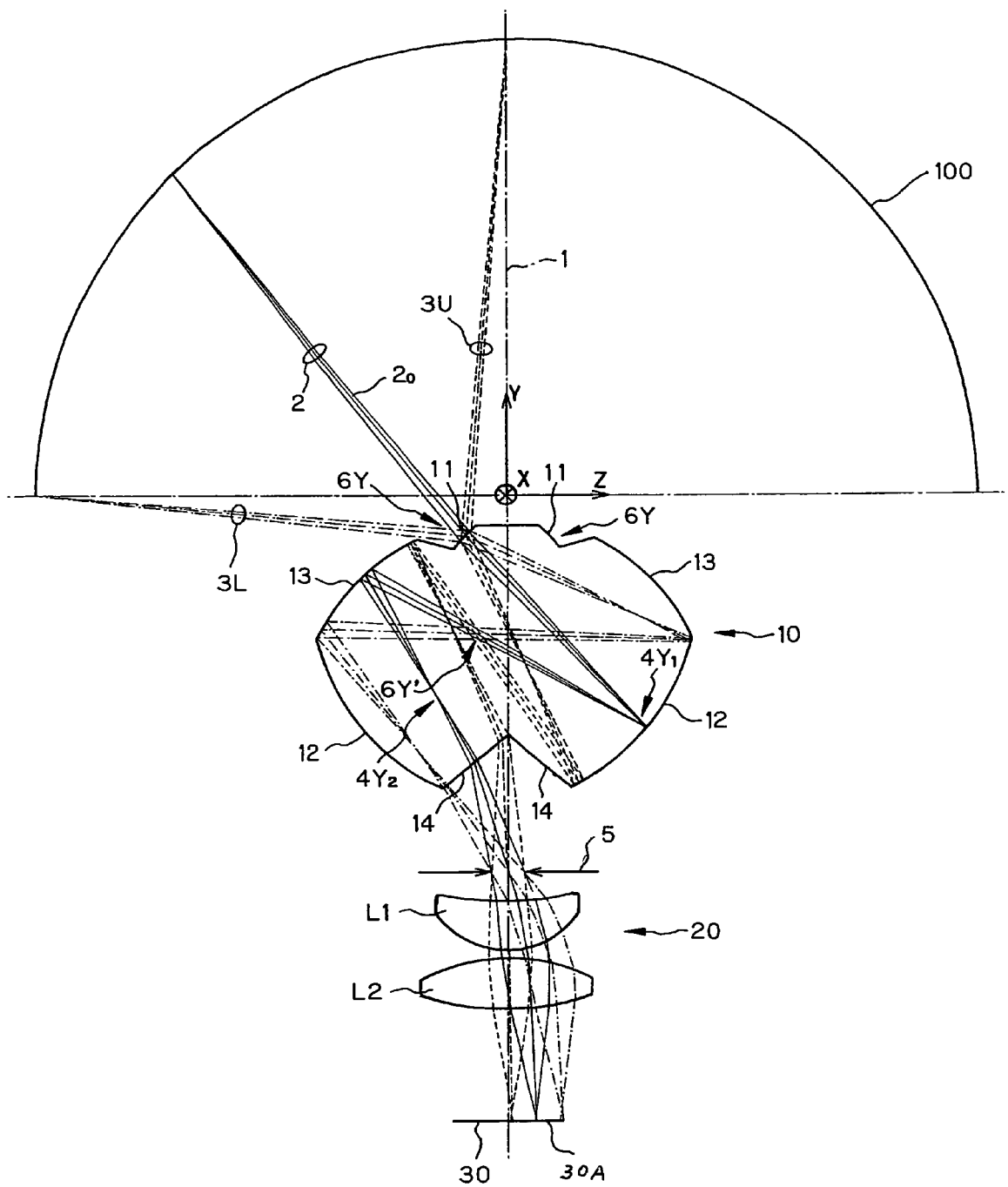
FIG. 1 is a sectional view of the optical system of Example 1 according to the invention, as taken along its center axis.
Figure 2:
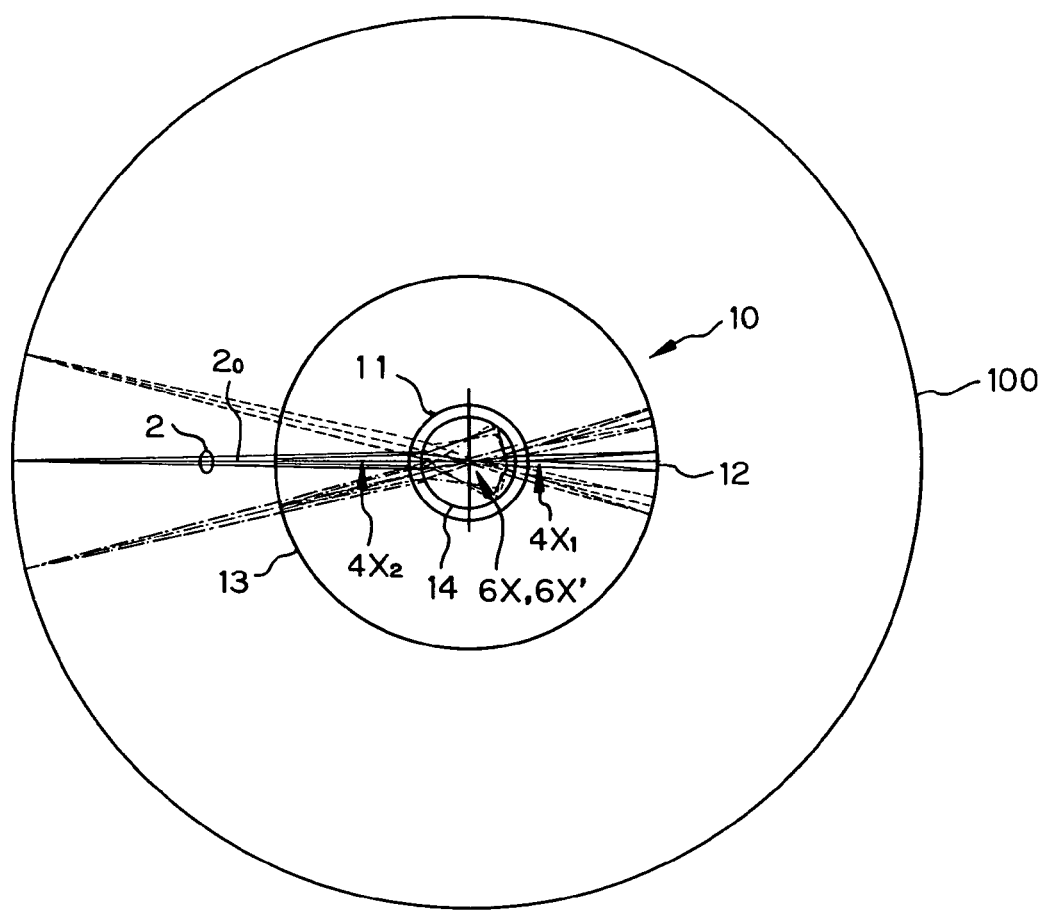
FIG. 2 is a plan view illustrative of an optical path through the optical system of Example 1 according to the invention.

FIG. 1 is a sectional view of the optical system of Example 1 to be described later, as taken along its center axis (rotationally symmetric axis) 1, and FIG. 2 is a plan view of an optical path through that optical system. With reference to FIGS. 1 and 2, the optical system of the invention is explained. While that optical system will be explained as an image-formation optical system adapted to form an image of a hemispherically curved object, it could be used as a projection optical system adapted to project a hemispherically curved image if the optical path is reversed. In FIG. 2, note that there are an optical path taken by light incident from a direction at an azimuth of 0° and an optical path taken by light incident from a direction at an azimuth of ±14°.

The optical path of the invention includes a front unit 10 and a rear unit 20, each rotationally symmetric about a center axis 1. A light beam 2 coming from a hemispherically curved object 100 passes through the front unit 10 and rear unit 20 in this order, forming an image 30A at a position of an image plane 30 vertical to, and off, the center axis 1.

The front unit 10 includes a resin or other transparent medium that is rotationally symmetric about the center axis 1 and has a refractive index greater than 1, and has two internal reflecting surfaces 12, 13 and two transmitting (entrance and exit) surfaces 11, 14. The internal reflecting surfaces 12, 13 and the transmitting surfaces 11, 14, too, are each of rotationally symmetric shape about the center axis 1. The rear unit 20 includes a coaxial dioptric system such as a lens system, which is rotationally symmetric about the center axis 1 and has positive power.

The transparent medium of the front unit 10 is made up of a first transmitting surface 11, a first reflecting surface 12, a second reflecting surface 13 and a second transmitting surface 14. The first transmitting surface 11 is located on a side that receives the light beam 2 from the curved object 100 with respect to the center axis 1. The first reflecting surface 12 is located in opposition to the first transmitting surface 11 with the center axis 1 between them and positioned nearer to the image plane 30 than to the first transmitting surface 11. The second reflecting surface 13 is located on the same side as the first transmitting surface 11 with respect to the center axis 1 and positioned on a side that faces away from the image plane 30 with respect to the first reflecting surface 12. The second transmitting surface 14 is located on the same side as the first transmitting surface 11 and positioned on a side that is nearer to the image plane 30 than to the first reflecting surface 12.

The light beam 2 coming from the curved object 100 enters the transparent medium via the first transmitting surface 11, and arrives at the first reflecting surface 12 located in opposition to the first transmitting surface 11 with the center axis 1 between them, at which it is reflected away from the image plane 30. Then, the reflected light travels to the second reflecting surface 13 located on the same side as the first transmitting surface 11 with respect to the center axis 1, at which it is reflected toward the image plane 30 side, leaving the transparent medium via the second transmitting surface 14. Finally, the light beam passes through a round aperture 5 that is located coaxially with the center axis 1 between the front unit 10 and the rear unit 20 to form a stop and the rear unit 20 having positive power, forming an image 30A at a radially given position of the image plane 30 off the center axis 1.

The role of the front unit 10 is to convert the light beam 2 from the hemispherically curved object 100 toward the center of the hemisphere into an annular aerial image 30A perpendicular to the rotationally symmetric axis 1.

It is then required that the surfaces 11-14 of the front unit 10 be positioned in such a way as not to interfere with the optical path, and so they be each located with a decentration to obliquely reflect or refract light rays. However, a decentered arrangement generally causes huge decentration aberrations, resulting in poor resolving power or a failure in getting hold of any large angle of view. In the invention, therefore, a rotationally symmetric surface shape formed by rotation about the center axis 1 of a line segment of any arbitrary shape having an odd-number degree term and having no symmetric surface is used, thereby successfully reducing decentration aberrations to obtain a plane image with high resolving power.

By making the front unit 10 of the transparent medium, productivity is improved, and by use of the back-surface reflecting surfaces 12 and 13, the aberrations produced can be much better corrected as well.

The role of the rear unit 20 is to project an annular aerial image 30A onto the image plane 30. Regarding the annular aerial image 30A converted at the front unit 10, there is often field curvature with its concave surface lying in the direction of travel of light rays. The rear unit 20 here has another role of making up for field curvature and astigmatism that remain undercorrected at the front unit 10.

Here let the meridional section be defined as a section including the center axis (rotationally symmetric axis) 1 of the optical system and the center ray (chief ray) $2_0$ of the center light beam 2 from the center of an angle of view, and the sagittal section as a section that is orthogonal to that meridional section and includes the center ray (chief ray) $2_0$. To obtain an annular plane image, the optical system of the invention is then allowed to have two entrance pupils 6Y in that meridional section, with the center axis between them.

An optical system in common use has only one entrance pupil with a stop defined by an aperture located on its rotationally symmetric axis (optical axis). For that reason, with the angle of view growing large, a light beam having a wider angle of view must be incident on the entrance pupil; that is, it is necessary to rely on a lens arrangement such as a so-called fisheye lens arrangement having a concave lens having strong negative power on the object side. However, there is then a problem that the strong negative concave lens incurs image distortion that may otherwise cause surrounding images to become small.

This problem is of much importance for an optical system like the inventive one, for which it is desired that substantially the same resolving power be obtained in every direction of a hemispherical object plane. According to the invention, that problem can be eliminated by forming two separate optical paths on the left and right sides in the meridional section, with the center axis 1 between them.

Typically, the optical system of the invention is designed such that the entrance pupil 6Y on the left side of the center axis 1 is adapted to seize images on the left hemispherical object plane, and the entrance pupil 6Y on the right side is operable to seize images on the right hemispherical object plane. In other words, if, in the meridional section, the entrance pupil 6Y is adapted to receive only light beams from objects on one side of the hemisphere, then the entrance pupil 6Y on the opposite side with respect to the center axis 1 can receive light beams from objects on the opposite side of the hemisphere.

Moreover, it is important that the left and right optical paths be located without interference. This is of much importance when, as in the embodiment of FIG. 1, the optical paths go laterally across the center axis 1, because interference of the paths with each surface results in a failure in forming any substantial surface. It is also important that the left and right image planes in the meridional section, too, be located in such positions as not to interfere each other or in such a way that images are formed on positions a bit off the center axis 1.

Furthermore, the left and right optical paths are rotationally symmetric with respect to the center axis 1, and by rotation of the shape of such meridional section about the center axis 1, it is possible to set up a rotationally symmetric optical system in which the image plane in a fan form about the center axis 1 assumes a generally zonal configuration.

Each entrance pupil 6Y, too, provides a zonal one; however, each entrance pupil 6Y only appears zonal when viewed from the direction of the center axis 1 where the lateral angles of view overlap in the meridional section (FIG. 1).

The front unit 10 may also function to split and project an image of the aperture 5 located on the center axis 1 onto two such left and right entrance pupils 6Y with the center axis 1 between them.

For at least one internal reflecting surface, it is desirable to use a rotationally symmetric surface shape defined by rotation about the center axis 1 of a line segment of any arbitrary shape having an odd-number degree term and having no symmetric plane. The use of that odd-number degree term is preferable for correction of aberrations, because a vertically asymmetric shape can be given to the center of the angle of view.

In the invention, the entrance pupils are optionally formed by back projection of the stop (aperture) 5 located on the center axis through the front unit 10, once the image of the aperture 5 has been formed. The feature of the invention here is that the entrance pupil positions differ in the meridional and the sagittal section such that in the meridional section, they are positioned near the first transmitting surface 11 (the entrance pupils 6Y in the meridional section), and in the sagittal section, they are positioned on the center axis (rotationally symmetric axis) 1 (the entrance pupils 6X in the sagittal section).

In an optical system including general spherical surfaces, both the entrance pupil in the meridional section and the entrance pupil in the sagittal section are supposed to be formed on the center axis. However, when an optical system like the inventive one is constructed of spherical surfaces, it is impossible to effectively locate a flare stop for cutting off harmful light supposed to enter the transparent medium, because the entrance pupil in the meridional section, too, will lie on the center axis, and so the effective range of the first transmitting surface 11 will become wide.

With the invention in which at least one internal reflecting surface is defined by rotation of a line segment of any arbitrary shape about the center axis 1, it is possible to independently set the curvature of the meridional section and the curvature of the sagittal section, so that only the entrance pupil 6Y in the meridional section—formed by back projection of the aperture 5, optionally once its image has been formed—can be located on the object side with respect to the center axis 1 of the front unit 10, thereby narrowing the effective range of the first surface (the first transmitting surface) 11 in the meridional section. This in turn enables unwanted light entering the front unit 10 to be considerably cut off to reduce flares.

In the sagittal section orthogonal to the center axis 1, on the other hand, light beams travel rotationally symmetrically because the optical system is a rotationally symmetric arrangement, and light beams from circumferential object points at the same vertical angle of view are always supposed to pass on the center axis 1 that is the center of rotation, or leave the front unit 10, traveling toward the center axis 1. In the sagittal section, therefore, the entrance pupil 6X lies on the center axis 1.

Such being the arrangement, it is important for the front unit 10 to include a surface of rotationally symmetric shape that is defined by the rotation about the center axis 1 of a line segment of any arbitrary shape to enable free control of curvature in the meridional and the sagittal section. At the front unit 10 here, there are some considerable decentration aberrations arising from reflection or refraction of light at or through the surfaces 11-14, each being located with a decentration and having power. For correction of those aberrations, it is important to use, for the internal reflecting surface 12, 13, in particular, a surface shape obtained by the rotation of a line segment of any arbitrary shape using an odd-number degree term, and having no symmetric surface.

According to such an arrangement with the center axis 1 as the Y-axis and a section including the center axis 1 (FIG. 1) as the Y-Z plane, a flare stop slit in the Y-direction can be positioned near the entrance pupils 6Y in the meridional section, so that unwanted light can be cut off by that flare stop.

For the flare stop, not just a mechanically slit stop but also a casing designed for eye protection and a transparent pipe (coaxial with the center axis 1) with an opaque portion painted black could be used. Alternatively, a reflection coating portion of the reflecting surface 13 or an optically unavailable area of the front unit 10 treated with sand or painted with a black paint could be used.

For the formation of the entrance pupils here, it is preferable that the number of images of the stop 5 formed in the sagittal section be the same as, or at least one more or one less than, that in the meridional section.

In Example 1 given later, the first transmitting surface 11 and the first reflecting surface 12 are located across the center axis 1, and the second reflecting surface 13 is located across the center axis 1 from the first reflecting surface 12 and on the same side as the first transmitting surface 11. In the sagittal section, therefore, a light beam will enter the stop 5 after transmitting twice through the center axis 1, as depicted in FIG. 2. This means that an aperture image, upon back projection of the aperture 5, will be formed on the optical axis 1 between the first transmitting surface 11 and the first reflecting surface 12 and on the center axis 1 between the first reflecting surface 12 and the second reflecting surface 13 as well.

In the sagittal section of Example 1, it follows that there is a double image formation, where the once formed aperture image is subject to an additional image formation. For better correction of aberrations, it is more preferable to make the powers in the sagittal section of the surfaces 11-14 in general, and the surfaces 12 and 13 in particular, approximately equal to those in the meridional section, and in the meridional section, it is also preferable, for correction of aberrations, to form the image of the stop 5 twice. In the invention, therefore, there are two images formed in the meridional section, too, i.e., an image 6Y formed near the first transmitting surface 11 and an image 6Y' formed between the first reflecting surface 12 and the second reflecting surface 13, as depicted in FIG. 1.

Further, if the position of back projection of the aperture 5 in the meridional section is set on the center axis 1, it will go against the purport of the invention, because of an increase in the effective diameter of the entrance surface 11, with the result that flares grow large. Furthermore, as the effective diameters of the surfaces 11-14 become large, it causes them to interfere with one another, rendering it impossible to ensure a wide angle of view in the vertical direction (the Y-direction).

In the invention, therefore, the aperture image 6Y of the images of the aperture 5 subjected to back projection, positioned nearest to the object side, is located near the first transmitting surface 11.

In Example 2 (FIG. 4) given later, the first transmitting surface 11 is located in opposition to the first reflecting surface 12, the second reflecting surface 13 and the second transmitting surface 14 with respect to the center axis 1, and so an image of the aperture 5 in the sagittal section is subjected to only a single back projection between the first transmitting surface 11 and the first reflecting surface 12. With this, that image is back projected only once onto near the first transmitting surface 11 in the meridional section, too.

In Example 3 (FIG. 7) described later, the first transmitting surface 11, the first reflecting surface 12, the second reflecting surface 13 and the second transmitting surface 14 are all found on the object side with respect to the center axis 1; that is, in the sagittal section, the aperture 5 is not back projected, because the light beam does not pass through the center axis 1 in the sagittal section. However, in an arrangement in which the aperture 5 is not back projected in the meridional section, too, there is one back projection allowed, because it goes against the purport of the invention.

It follows that for correction of aberrations, the number of image formations by the stop 5 in the sagittal section should preferably be equal to, or one more or one less than, the number of image formations by the stop 5 in the meridional section.

For an optical system designed to seize a light beam 2 from a hemispherical object 100 as contemplated herein, it is desired that an entrance pupil be positioned at the center of the hemisphere. In the optical system of the invention, however, the entrance pupil cannot be located at the center of the hemisphere, because the center axis 1 lies there. Therefore, the first transmitting surface 11 is located near the center axis 1 with such a tilt that the transmitted light beam is refracted toward the image plane side. This prevents the light beam upon transmission of the first transmitting surface 11 from interfering with the first reflecting surface 12 on which the light beam is incident via the opposite entrance pupil 6Y positioned with the center axis 1 between them. Further, if a proper tilt is given to the first transmitting surface 11, it is then possible to avoid interference between the first reflecting surface 11 and the second transmitting surface 14.

Further in Example 3, the optical path for the front unit 10 is found on only one side with respect to the center axis 1, and so no care is taken of interference of the surfaces with a light beam from the entrance pupil 6Y located oppositely with respect to the center axis 1. Conversely, however, the first transmitting surface 11 cannot be located near the center of the hemisphere; the first transmitting surface 11 comes closer to the hemispherical object 100, resulting in a very large observation angle of view. In other words, unless the first transmitting surface 11 is located with a tilt of about 45° to seize light rays at a wide angle of view in the front unit 10, the light beam will be incapable of entering the front unit 10.

To allow a hemispherically wide angle of view to be seized in the front unit 10, the angle of the first transmitting surface 11 thus grows important. In other words, it is important to satisfy the following condition (1).

$$-60° < \theta_1 < -20° \quad (1)$$

Here $\theta_1$ is the angle with respect to the center axis 1 of a tangential plane at a position of the first transmitting surface 11 on which the center ray (chief ray) 20 of the center light beam 2 from the center of the angle of view is incident.

As the lower limit of −60° to this condition is not reached, it renders it impossible to get hold of a downward angle of view at a hemispherical screen, and with the upper limit of −20° exceeded, it is impossible to get hold of any zenithal angle of view at the hemispherical screen.

The position of the first transmitting surface 11 with respect to the whole front unit 10 also grows important to avoid interference between the optical path and the surface. On the basis of the height of the front unit 10 perpendicularly to the image plane 30, let $H_1$ stand for the height of the front unit 10 from the top to the bottom end, and $H_2$ represent the height of the front unit 10 from the top end to the position of the first transmitting surface 11 on which the center ray $2_0$ is incident. It is then preferable to satisfy the following condition (2).

$$1.2 < H_1/H_2 \quad (2)$$

As the lower limit of 1.2 to this condition is not reached, it causes the transmitting surface 11 to be positioned too low, and so the front unit 10 per se becomes an obstacle to the field of view, resulting in a failure in getting hold of a wide angle of view on observation.

More preferably, $$2 < H_1/H_2 \quad (2\text{-}1)$$

The feature of the optical system of the invention is that, as described above, the entrance pupils 6Y in the meridional section are projected onto near the first transmitting surface 11, so that the flare stop for prevention of ghosts or the like can be effectively located. This offers another advantage of downsizing the effective area of the entrance surface 11 of the optical system in the meridional section and, hence, effectively preventing unwanted light from entering the front unit 10, thereby achieving eradication of flares. To this end, it is of much importance to satisfy the following condition (3).

Here, let A be indicative of an optical path length from the position of the entrance pupils 6Y in the meridional section to the position of the stop 5, and B be indicative of an optical path length from the position of the entrance pupils 6Y to the first transmitting surface 11 of the front unit 10. To what degree the entrance pupils 6Y are located near the entrance surface 11 of the front unit 10 is given by |A/B|. Then, |A/B| should preferably satisfy condition (3).

$$5 < |A/B| \quad (3)$$

As the lower limit of 5 to condition (3) is not reached, it causes the entrance pupils 6Y to be away from the first surface 11 of the optical system. In other words, the effective diameter of the first surface 11 grows too large to cut off harmful flare light incident on the front unit 10. The larger that value, the more effectively the flare-preventive flare stop can work.

More preferably, $$20 < |A/B| \quad (3\text{-}1)$$

Set out below are the values of A, B, |A/B|, $H_1$, $H_2$ and $H_1/H_2$ in Examples 1, 2 and 3 given later.

|           | Example 1 | Example 2 | Example 3 |
|-----------|-----------|-----------|-----------|
| A         | 31.827    | 22.629    | 16.433    |
| B         | 0.022     | 0.039     | 0.005     |
| |A/B|     | 1462.605  | 576.341   | 3600.538  |
| $H_1$     | 5.000     | 6.600     | 3.300     |
| $H_2$     | 0.100     | 0.100     | 1.900     |
| $H_1/H_2$ | 50.000    | 66.000    | 1.737     |

Examples 1, 2 and 3 of the optical system according to the invention are now explained in further details; however, their constructional parameters will be given later. The constructional parameters of Example 1 (and Example 7 given later) have been determined as a result of normal ray tracing from an object plane to the image plane 30 via the front unit 10 and the rear unit 20, as typically illustrated in FIG. 1.

Referring to a coordinate system on normal ray tracing, the origin of a decentered optical surface in a decentered optical system is defined by the center of curvature of the hemispherical object 100, the Y-axis positive direction is defined by a direction of the rotationally symmetric axis (center axis) 1 away from the image plane 30, and, the Y-Z plane is defined by the paper of FIG. 1. as shown typically in FIG. 1. And then, the Z-axis positive direction is defined by a direction opposite to the side of the entrance pupils 6Y now considered, and the X-axis positive direction is defined by an axis that forms with the Y- and Z-axes a right-handed orthogonal coordinate system.

The amount of decentration from the center of the origin of the aforesaid optical system on a coordinate system on which that surface is defined (X, Y and Z are indicative of the X-axis direction, the Y-axis direction, and the Z-axis direction, respectively), and the angles of tilt ($\alpha$, $\beta$, $\gamma$ (°)) of the coordinate systems for defining the surfaces with the centers on the X-, Y- and Z-axes, respectively, are necessary for describing a decentered surface. In that case, the positive signs for $\alpha$ and $\beta$ mean counterclockwise rotation with respect to the positive directions of the respective axes, and the positive sign for $\gamma$ means clockwise rotation with respect to the positive direction of the Z-axis. Referring here to how to perform $\alpha$-, $\beta$- and $\gamma$-rotations of the center axis of the surface, the coordinate system that defines each surface is first $\alpha$-rotated counterclockwise about the X-axis of the coordinate system that is defined at the origin of the optical system. Then, the coordinate system is $\beta$-rotated counterclockwise about the Y-axis of the rotated new coordinate system. Finally, the coordinate system is $\gamma$-rotated clockwise about the Z-axis of the rotated new another coordinate system.

In the case of optical surfaces forming the optical system of each example, when a specific surface and the subsequent surface form together a coaxial optical system, a surface spacing may be determined. In addition, the radius of curvature of each surface and the refractive index and Abbe number of the medium may be determined according to common practices.

It is noted that the term regarding aspheric surfaces, on which no data are mentioned in the later-given constructional parameters, is zero. Refractive indices and Abbe numbers are given on a d-line (587.56 nm wavelength) basis, with length expressed in mm. The decentration of each surface is given in terms of the amount of decentration from the center of curvature of the hemispherical object 100.

In this regard, an aspheric surface is a rotationally symmetric aspheric surface given by the following defining formula:

$$Z=(Y^2/R)/[1+\{1-(1+k)Y^2/R^2\}^{1/2}]+aY^4+bY^6+cY^8+dY^{10}+\ldots \quad (a)$$

Here, Z is an axis, Y is a direction vertical to that axis, R is a paraxial radius of curvature, k is a conical coefficient, and a, b, c, d are the fourth-, sixth-, eighth-, tenth-order aspheric coefficients, respectively. The Z-axis in this defining formula becomes the axis of the rotationally symmetric aspheric surface.

The extended rotation free-form surface is a rotationally symmetric surface given by the following definition.

First, there is given the following curve (b) passing on a Y-Z coordinate plane through its origin.

$$Z=(Y^2/RY)/[1+\{1-(C_1+1)Y^2/RY^2\}^{1/2}]$$

$$C_2Y+C_3Y^2+C_4Y^3+C_5Y^4+C_6Y^5+C_7Y^6$$

$$+\ldots+C_{21}Y^{20}+\ldots+C_{n+1}Y^n+\ldots \quad (b)$$

Then, there is given a curve F(Y) where the curve (b) is rotated by an angle $\theta$ (°) with left rotation defined as positive relative to the X-axis positive direction. This curve F(Y), too, passes on the Y-Z coordinate plane through the origin.

That curve F(Y) is parallelly translated by a distance R in the Z-positive direction (in the Z-negative direction in the case of a negative sign), and the parallel translated curve is then rotated about the Y-axis. The thus obtained rotationally symmetric surface gives an extended rotation free-form surface.

As a consequence, the extended rotation, free-form surface provides a free-form surface (smooth curve) in the Y-Z plane, and a circle with a radius |R| in the X-Z plane.

From this definition, the Y-axis becomes the axis of the extended rotation free-form surface.

Here, RY is the radius of curvature of a spherical term in the Y-Z section, $C_1$ is a conical constant, and $C_2, C_3, C_4, C_5, \ldots$ are the first-, second-, third- and fourth-order aspheric coefficients, respectively.

In the optical system of the invention, at least one reflecting surface of the front unit 10 should preferably be such an extended rotation free-form surface that, when expressed by a polynomial in the Y-Z section, takes on a rotationally symmetric shape formed by rotation about the center axis 1 of a line segment of any arbitrary shape having at least an odd-number degree term yet having no symmetric surface. If such a surface shape is imparted to at least one reflecting surface, it is possible to provide an optical system whose resolving power is improved by correction of decentration aberrations unavoidable with a catoptric system, and diminish the size of that optical system.

FIG. 1 is illustrative in section of the optical system of Example 1, as taken along its center axis (rotationally symmetric axis) 1, and FIG. 2 is a plan view illustrative of an optical path through that optical system. In FIG. 2, an optical path incident from the direction of an azimuth 0° and optical paths incident from the directions of azimuths ±14° are shown.

The optical system of this example is made up of a front unit 10 that is rotationally symmetric about the center axis 1, a rear unit 20 that is rotationally symmetric about the center axis 1 and an aperture 5 located coaxially with the center axis 1 between the front unit 10 and the rear unit 20, and a light beam 2 coming from a hemispherically curved object 100 with the origin as the center of curvature travels through the front unit 10 and the rear unit 20 in this order, forming an image 30A at a position of an image plane 30 vertical to, and off, the center axis 1. With the center axis 1 set perpendicularly (vertically), there is an annular image 30A formed on the image plane 30, which has a full 360°-direction (full-panoramic) angle of view along the circular edge of the hemispherically curved object 100 with the center of the hemispherically curved object 100 lying in the center direction of the image and the edge line of the hemispherically curved object becoming an outer circle.

The front unit 10 includes a resin or other transparent medium that is rotationally symmetric about the center axis 1 and has a refractive index greater than 1, and includes two internal reflecting surfaces 12, 13 and two transmitting (entrance and exit) surfaces 11, 14. The internal reflecting surfaces 12, 13 and the transmitting surfaces 11, 14 are each of rotationally symmetric shape about the center axis 1. Specifically, the rear unit 20 is built up of a lens system composed of two lenses L1 and L2, each rotationally symmetric about the center axis 1, and having positive power.

The transparent medium of the front unit 10 is made up of a first transmitting surface 11, a first reflecting surface 12, a second reflecting surface 13 and a second transmitting surface 14. The first transmitting surface 11 is located on a side on which the light beam 2 from the curved object 100 is incident with respect to the center axis 1. The first reflecting surface 12 is located in opposition to the first transmitting surface 11, with the center axis 1 between them and nearer to the image plane 30 side than to the first transmitting surface 11. The second reflecting surface 13 is located on the same side as the first transmitting surface 11 with respect to the center axis 1 and in opposition to the image plane 30 with respect to the first reflecting surface 12. The second transmitting surface 14 is located on the same side as the first transmitting surface 11 and nearer to the image plane 30 side than to the first reflecting surface 12.

And then, the light beam 2 coming from the curved object 100 enters the transparent medium via the first transmitting surface 11, and arrives at the first reflecting surface 12 located in opposition to the first transmitting surface 11 with the center axis 1 between them, at which it is reflected away from the image plane 30. Then, the reflected light beam arrives at the second reflecting surface 13 located on the same side as the first transmitting surface 11 with respect to the center axis 1, at which it is reflected toward the image plane 30 side, leaving the transparent medium via the second transmitting surface 14. The transmitted light enters the rear unit 20 via the stop-forming round aperture 5 located coaxially with the center axis 1 between the front unit 10 and the rear unit 20, forming an image at a radially given position of the image plane 30 off the center axis 1. The first transmitting surface 11, the first reflecting surface 12, the second reflecting surface 13 and the second transmitting surface 14 are all made up of extended rotation free-form surfaces; however, their conical coefficients are zero.

The lens system that forms the rear unit 20 is composed of, in order from the front unit 10 side, a positive meniscus lens L1 concave on its front unit 10 side and a double-convex positive lens L2.

With the center axis 1 passing through the center of the hemispherically curved object 100, the center light beam 2 coming from a position of the curved object 100 in a direction having an elevation angle of 45° as viewed from the center of curvature of the curved object 100 is refracted through the first transmitting surface 11 that is the entrance surface, entering the transparent medium of the front unit 10. The transmitted light beam is reflected at the first reflecting surface 12 and the second reflecting surface 13 in this order, and then refracted through the second transmitting surface 14, leaving the transparent medium of the front unit 10. Finally, the transmitted light beam is incident on the rear unit 20 via the aperture 5, forming an image 30A at a radially given position of the image plane 30 off the center axis 1.

In the optical system of this example, the aperture (stop) 5 located between the front unit 10 and the rear unit 20 is once projected onto the object side to form an image 6Y' in the meridional section, and that image is again back projected to form an entrance pupil 6Y in the meridional section, which lies near the first transmitting surface 11 of the front unit 10. In the sagittal section, on the other hand, two images 6X' and 6X are formed on the center axis 1 (rotationally symmetric axis) 1 while an entrance pupil 6X is formed on the center axis 1.

In addition, in the optical system of this example, light beams 2, 3U and 3L coming from the hemispherically curved object 100 via the entrance pupil 6Y (3U is a light beam coming from the center of the hemispherically curved object 100 and 3L is a light beam coming from the circular edge of the hemispherically curved object 100) form an image once at a position $4Y_1$ near the first reflecting surface 12 in a section including the center axis 1 (the meridional section: FIG. 1), and form an image again at a position $4Y_2$ between the second reflecting surface 13 and the second transmitting surface 14. In a plane that is orthogonal to the plane including the center axis 1 and includes the center ray $2_0$ of that light beam 2 (the sagittal section: FIG. 2), on the other hand, they form images, once at a position $4X_1$ between the first transmitting surface 11 and the first reflecting surface 12 and again a position $4X_2$ between the second reflecting surface 13 and the second transmitting surface 14.

The specifications of Example 1 are:

Horizontal Angle of View: 360°

Vertical Angle of View (relative to the center of curvature of the hemispherically curved object):
90° (the center angle of view: 45°)

Incident NA (numerical aperture): 0.014

Image Size: φ0.10 to φ2.00 mm

Figure 3:
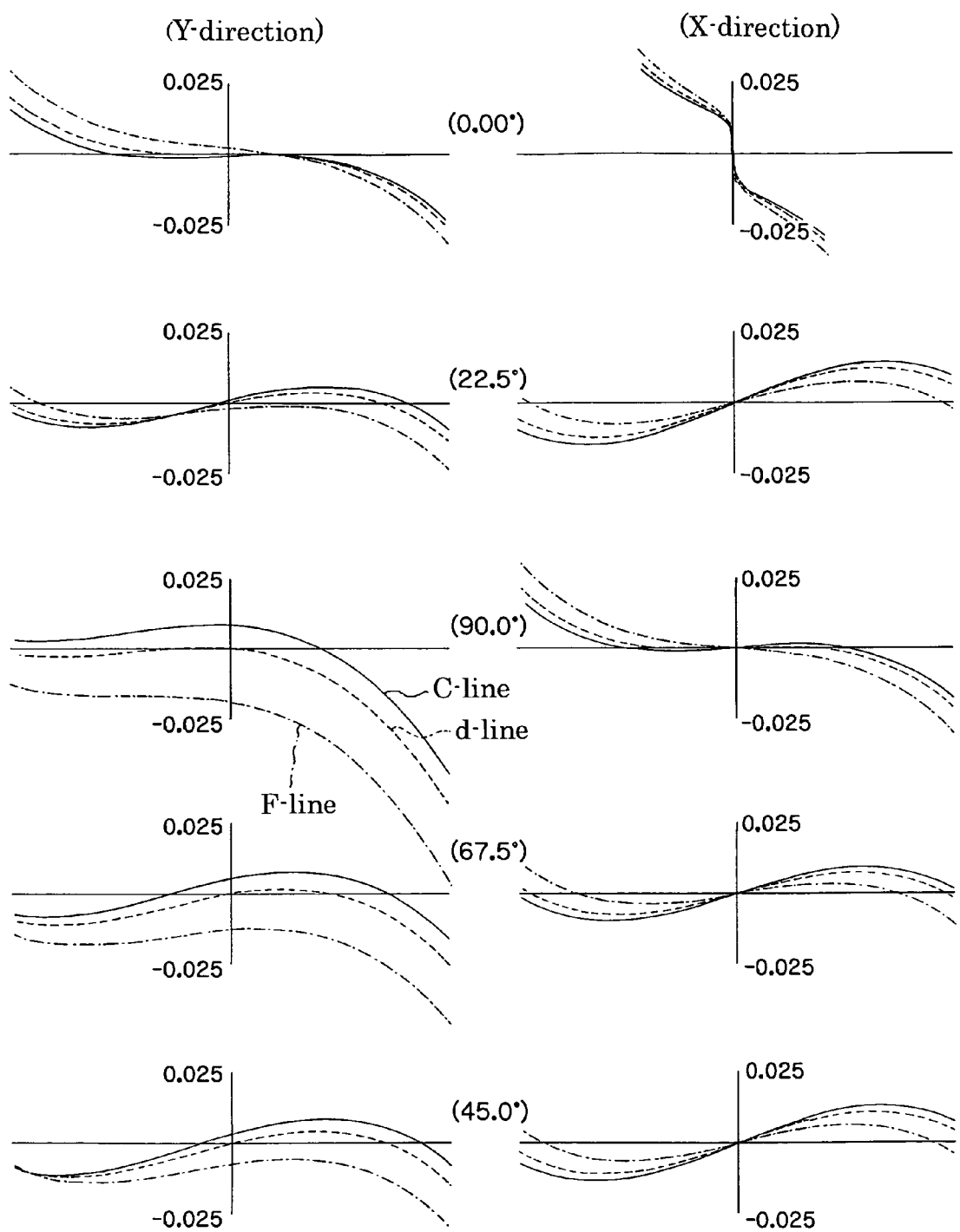
FIG. 3 is a transverse aberration diagram for Example 1.

FIG. 3 is a transverse aberration diagram for the optical system of this example. Throughout such transverse aberration diagrams in the present disclosure, the angle mentioned at the center is indicative of an angle of view in the perpendicular direction as viewed from the center of curvature of the hemispherical object 100 (the origin), and each diagram is illustrative of transverse aberrations at that angle of view in the Y (meridional)-direction and the X (sagittal)-direction with the center and edge directions of the hemispherical object 100 as 0° and 90°, respectively.

Further with respect to the optical system of the invention, in which the radius of curvature of the hemispherical object 100 is set at 1 m as an example, good images can be obtained if the distance of the image plane 30 from the rear surface of the double-convex positive lens L2 is changed from 2.07 mm (the difference in the Y-direction between the position of decentration (10) and the position of decentration (11) in the constructional parameters given later) to 2.00 mm.

Figure 4:
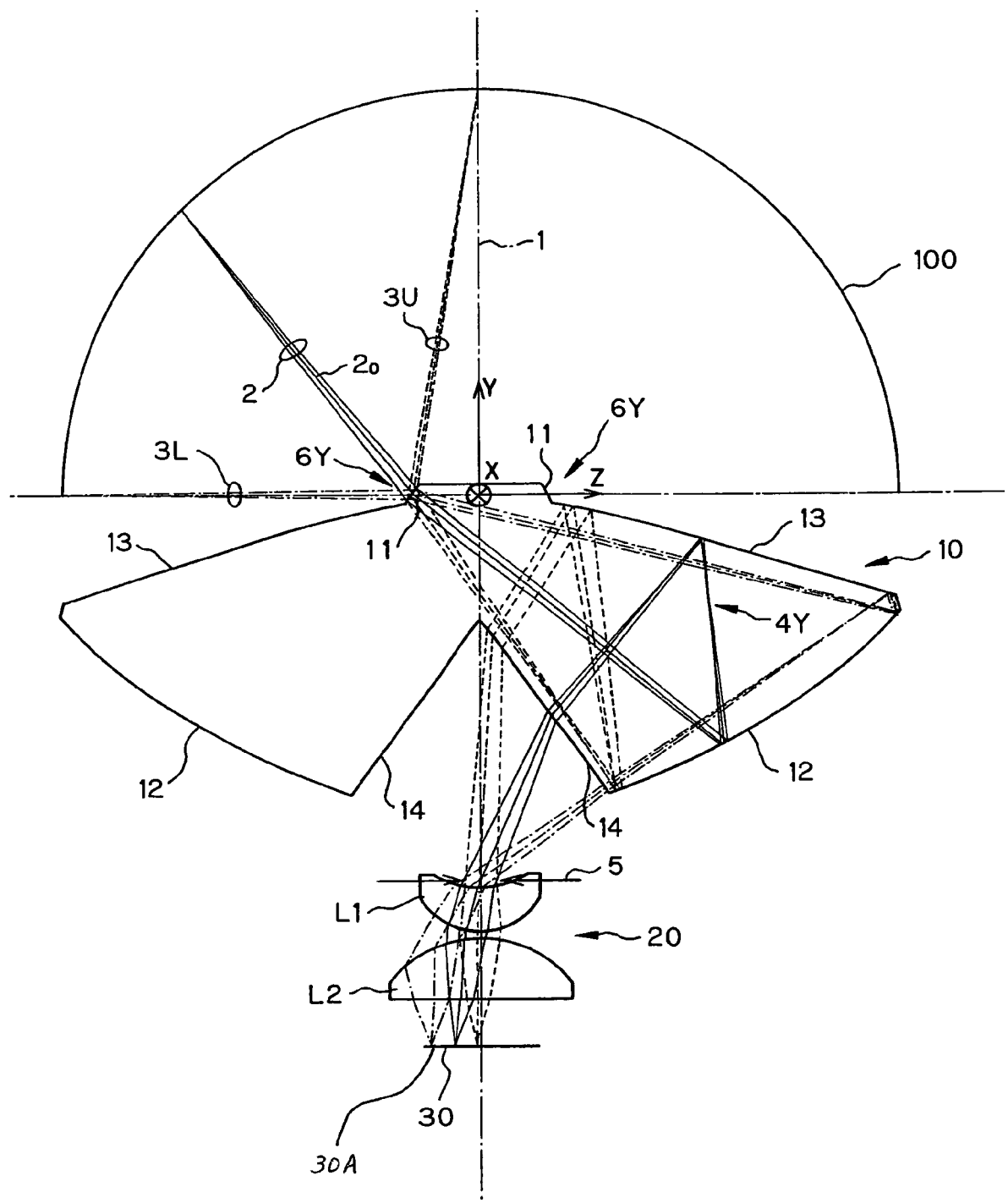
FIG. 4 is a sectional view of the optical system of Example 2 according to the invention, as taken along its center axis.
Figure 5:
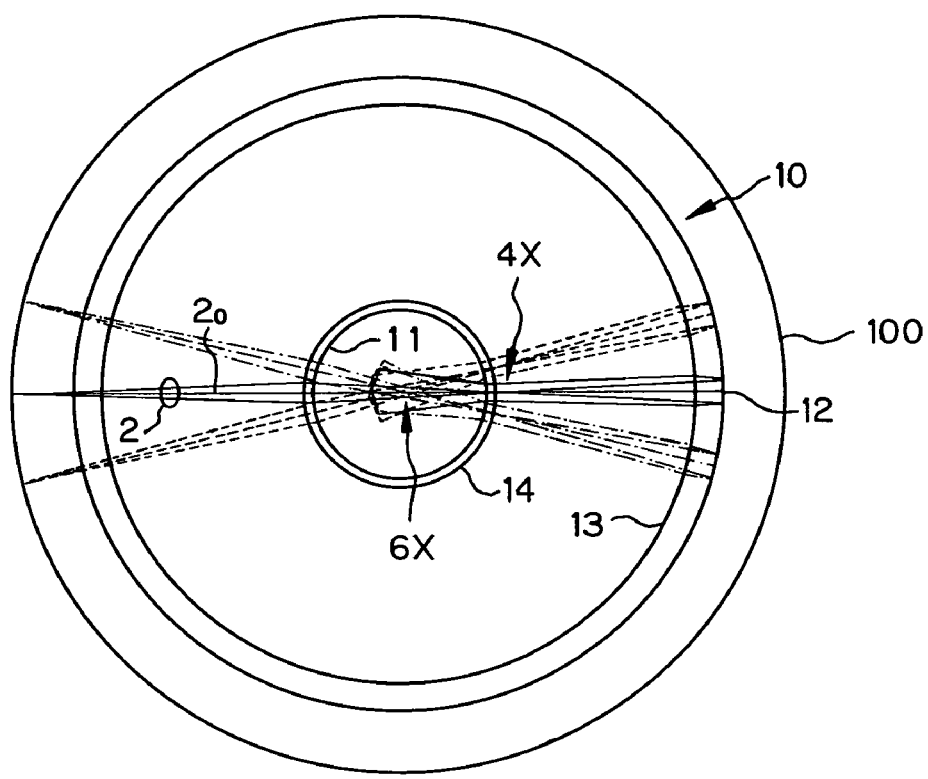
FIG. 5 is a plan view illustrative of an optical path through the optical system of Example 2 according to the invention.

FIG. 4 is illustrative in section of the optical system of Example 2 as taken along its center axis (rotationally symmetric axis) 1, and FIG. 5 is a plan view illustrative, as in FIG. 2, of an optical path through that optical system.

The optical system of this example is made up of a front unit 10 that is rotationally symmetric about the center axis 1, a rear unit 20 that is rotationally symmetric about the center axis 1 and an aperture 5 located coaxially with the center axis 1 between the front unit 10 and the rear unit 20. A light beam 2 coming from a hemispherically curved object 100 with the origin as the center of curvature travels through the front unit 10 and the rear unit 20 in this order, forming an image 30A at a position of an image plane 30 vertical to, and off, the center axis 1. With the center axis 1 set perpendicularly (vertically), there is an annular image 30A formed on the image plane 30, which has a full 360°-direction (full-panoramic) angle of view along the circular edge of the hemispherically curved object 100 with the center of the hemispherically curved object 100 lying in the center direction of the image and the edge line of the hemispherically curved object becoming an outer circle.

The front unit 10 includes a resin or other transparent medium that is rotationally symmetric about the center axis 1 and has a refractive index greater than 1, and includes two internal reflecting surfaces 12, 13 and two transmitting (entrance and exit) surfaces 11, 14. The internal reflecting surfaces 12, 13 and the transmitting surfaces 11, 14 are each of rotationally symmetric shape about the center axis 1. Specifically, the rear unit 20 is built up of a lens system composed of two lenses L1 and L2, each rotationally symmetric about the center axis 1, and having positive power.

The transparent medium of the front unit 10 is made up of a first transmitting surface 11, a first reflecting surface 12, a second reflecting surface 13 and a second transmitting surface 14. The first transmitting surface 11 is located on a side on which the light beam 2 from the curved object 100 is incident with respect to the center axis 1. The first reflecting surface 12 is located in opposition to the first transmitting surface 11 with the center axis 1 between them and nearer to the image plane 30 than the first transmitting surface 11. The second reflecting surface 13 is located opposite to the first transmitting surface 11 with respect to the center axis 1 and in opposition to the image plane 30 with respect to the first reflecting surface 12. The second transmitting surface 14 is located opposite to the first transmitting surface 11 and nearer to the image plane 30 side than the first reflecting surface 12.

The light beam 2 coming from the curved object 100 enters the transparent medium via the first transmitting surface 11, and arrives at the first reflecting surface 12 located in opposition to the first transmitting surface 11 with the center axis 1 between them, at which it is reflected away from the image plane 30. Then, the reflected light beam arrives at the second reflecting surface 13 located opposite to the first transmitting surface 11 with respect to the center axis 1, at which it is reflected toward the image plane 30 side, leaving the transparent medium via the second transmitting surface 14. The transmitted light enters the rear unit 20 via the stop-forming round aperture 5 located coaxially with the center axis 1 between the front unit 10 and the rear unit 20, forming an image 30A at a radially given position of the image plane 30 off the center axis 1. The first transmitting surface 11, the first reflecting surface 12, the second reflecting surface 13 and the second transmitting surface 14 are all made up of extended rotation free-form surfaces; however, their conical coefficients are zero.

The lens system that forms the rear unit 20 is composed of, in order from the front unit 10 side, a positive meniscus lens L1 concave on its front unit 10 side and a double-convex positive lens L2.

With the center axis 1 passing through the center of the hemispherically curved object 100, the center light beam 2 coming from a position of the curved object 100 in a direction having an elevation angle of 45° as viewed from the center of curvature of the curved object 100 is refracted through the first transmitting surface 11 that is the entrance surface, entering the transparent medium of the front unit 10. The transmitted light beam is reflected at the first reflecting surface 12 and the second reflecting surface 13 in this order, and then refracted through the second transmitting surface 14, leaving the transparent medium of the front unit 10. Finally, the transmitted light beam is incident on the rear unit 20 via the aperture 5, forming an image 30A at a radially given position of the image plane 30 off the center axis 1.

In the optical system of this example, the aperture (stop) 5 located between the front unit 10 and the rear unit 20 is once projected onto the object side to form an image 6Y' in the meridional section, and that image is again back projected to form an entrance pupil 6Y in the meridional section, which lies near the first transmitting surface 11 of the front unit 10. In the sagittal section, on the other hand, two images 6X' and 6X are formed on the center axis 1 (rotationally symmetric axis) 1 while an entrance pupil 6X is formed on the center axis 1.

And, in the optical system of this example, light beams 2, 3U and 3L coming from the hemispherically curved object 100 via the entrance pupil 6Y (3U is a light beam coming from the center of the hemispherically curved object 100 and 3L is a light beam coming from the circular edge of the hemispherically curved object 100) form an image 4Y once between the first reflecting surface 12 and the second reflecting surface 13 in a section including the center axis 1 (the meridional section: FIG. 4), and form an image once at a position 4X between the first transmitting surface 11 and the first reflecting surface 12 in a plane that is orthogonal to the plane including the center axis 1 and includes the center ray $2_0$ of that light beam 2 (the sagittal section: FIG. 5).

The specifications of Example 2 are:

Horizontal Angle of View: 360°

Vertical Angle of View (relative to the center of curvature of the hemispherically curved object):
90° (the center angle of view: 45°)

Incident NA (numerical aperture): 0.022

Image Size: $\phi 0.14$ to $\phi 2.00$ mm

Figure 6:
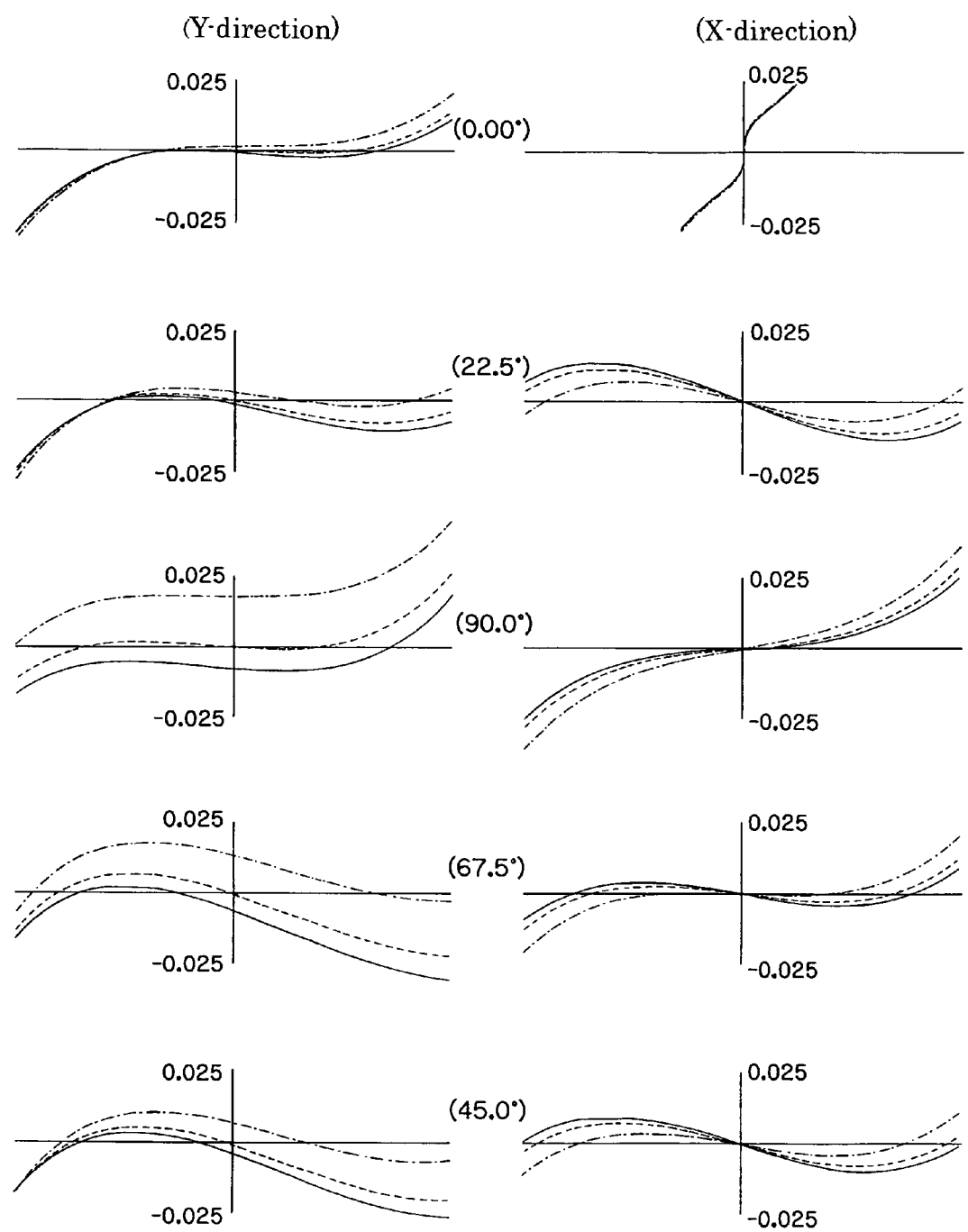
FIG. 6 is a transverse aberration diagram for Example 2.

FIG. 6 is a transverse aberration diagram, as in FIG. 3, for the optical system of this example.

Figure 7:
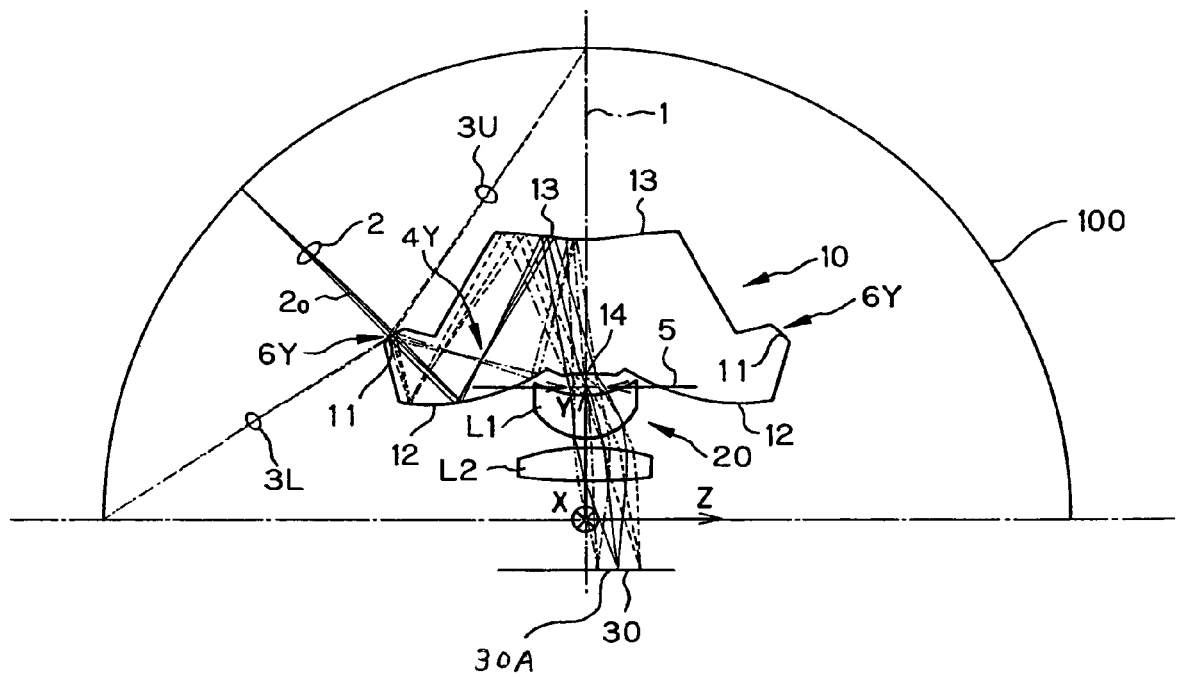
FIG. 7 is a sectional view of the optical system of Example 3 according to the invention, as taken along its center axis.
Figure 8:
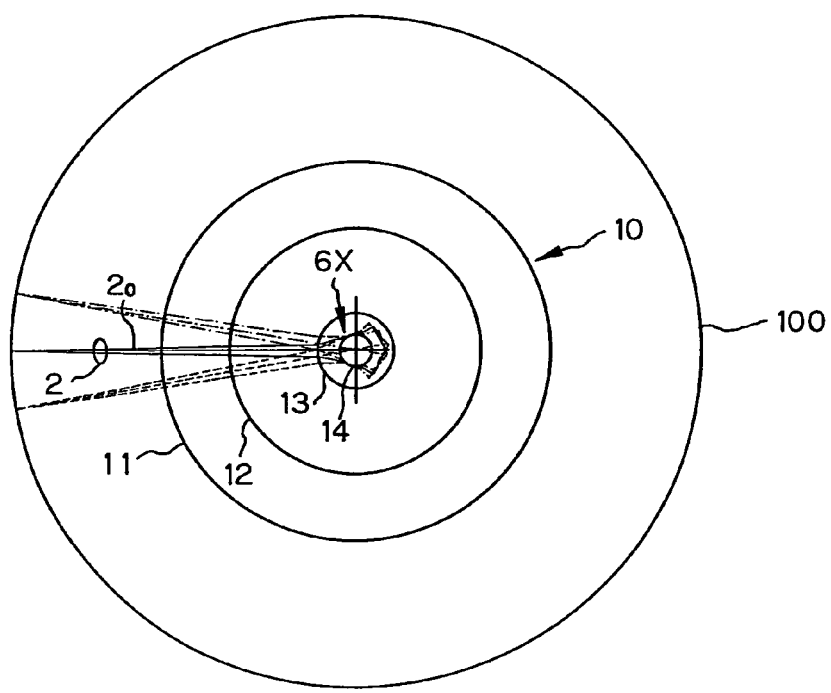
FIG. 8 is a plan view illustrative of an optical path through the optical system of Example 3 according to the invention.

FIG. 7 is illustrative, in section, of the optical system of Example 3 as taken along its center axis (rotationally symmetric axis) 1, and FIG. 8 is a plan view illustrative, as in FIG. 2, of an optical path through that optical system.

The optical system of this example is made up of a front unit 10 that is rotationally symmetric about the center axis 1, a rear unit 20 that is rotationally symmetric about the center axis 1 and an aperture 5 located coaxially with the center axis 1 between the front unit 10 and the rear unit 20. A light beam 2 coming from a hemispherically curved object 100 with the origin as the center of curvature travels through the front unit 10 and the rear unit 20 in this order, forming an image 30A at a position of an image plane 30 vertical to, and off, the center axis 1. With the center axis 1 set perpendicularly (vertically), there is an annular image 30A formed on the image plane 30, which has a full 360°-direction (full-panoramic) angle of view along the circular edge of the hemispherically curved object 100 with the center of the hemispherically curved object 100 becoming an outer circle and the edge line of the hemispherically curved object 100 lying in the center direction.

The front unit 10 includes a resin or other transparent medium that is rotationally symmetric about the center axis 1 and has a refractive index greater than 1, and includes two internal reflecting surfaces 12, 13 and two transmitting (entrance and exit) surfaces 11, 14. The internal reflecting surfaces 12, 13 and the transmitting surfaces 11, 14 are each of rotationally symmetric shape about the center axis 1. Specifically, the rear unit 20 is built up of a lens system composed of two lenses L1 and L2, each rotationally symmetric about the center axis 1, and having positive power.

The transparent medium of the front unit 10 is made up of a first transmitting surface 11, a first reflecting surface 12, a second reflecting surface 13 and a second transmitting surface 14. The first transmitting surface 11 is located on a side on which the light beam 2 from the curved object 100 is incident with respect to the center axis 1. The first reflecting surface 12 is located on the same side of the center axis 1 as the first transmitting surface 11 and nearer to the image plane 30 than the first transmitting surface 11. The second reflecting surface 13 is located on the same side as the first transmitting surface 11 and the first reflecting surface 12 with respect to the center axis 1, and in opposition to the image plane 30 with respect to the first reflecting surface 12. The second transmitting surface 14 is located coaxially with the center axis 1 and nearer to the image plane 30 side than the first reflecting surface 12.

The light beam 2 coming from the curved object 100 enters the transparent medium via the first transmitting surface 11, and arrives at the first reflecting surface 12 located on the same side as the first transmitting surface 11 with respect to the center axis 1, at which it is reflected away from the image plane 30. Then, the reflected light beam arrives at the second reflecting surface 13 located on the same side as the first transmitting surface 11 and the first reflecting surface 12 with respect to the center axis 1, at which it is reflected toward the image plane 30 side, leaving the transparent medium via the second transmitting surface 14. The transmitted light enters the rear unit 20 via the stop-forming round aperture 5 located coaxially with the center axis 1 between the front unit 10 and the rear unit 20, forming an image 30A at a radially given position of the image plane 30 off the center axis 1. The first transmitting surface 11, the first reflecting surface 12 and the second reflecting surface 13 of the front unit 10 are all made up of extended rotation free-form surfaces; however, their conical coefficients are zero. On the other hand, the second transmitting surface 14 is made up of a rotationally asymmetric aspheric surface with the vertex lying on the center axis 1.

The lens system that forms the rear unit 20 is composed of, in order from the front unit 10 side, a positive meniscus lens L1 concave on its front unit 10 side and a double-convex positive lens L2.

With the center axis 1 passing through the center of the hemispherically curved object 100, the center light beam 2, which comes from a position of the curved object 100 in a direction having an elevation angle of 45° as viewed from the center of curvature of the curved object 100, is refracted through the first transmitting surface 11 that is the entrance surface, entering the transparent medium of the front unit 10. The transmitted light beam is reflected at the first reflecting surface 12 and the second reflecting surface 13 in this order, and then refracted through the second transmitting surface 14, leaving the transparent medium of the front unit 10. Finally, the transmitted light beam is incident on the rear unit 20 via the aperture 5, forming an image 30A at a radially given position of the image plane 30 off the center axis 1.

In the optical system of this example, the aperture (stop) 5 located between the front unit 10 and the rear unit 20 is projected onto the object side to form an entrance pupil 6Y in the meridional section, which lies near the first transmitting surface 11 of the front unit 10. In the sagittal section, on the other hand, an entrance pupil 6X is formed by the aperture (stop) 5 per se.

And, in the optical system of this example, light beams 2, 3U and 3L coming from the hemispherically curved object 100 via the entrance pupil 6Y (3U is a light beam coming from the center of the hemispherically curved object 100 and 3L is a light beam coming from the circular edge of the hemispherically curved object 100) form an image 4Y once between the first reflecting surface 12 and the second reflecting surface 13 in a section including the center axis 1 (the meridional section: FIG. 7), but does not form any image in a plane that is orthogonal to the plane including the center axis 1 and includes the center ray $2_0$ of that light beam 2 (the sagittal section: FIG. 8).

The specifications of Example 3 are:

Horizontal Angle of View: 360°

Vertical Angle of View (relative to the center of curvature of the hemispherically curved object):
90° (the center angle of view: 45°)

Incident NA (numerical aperture): 0.021

Image Size: $\phi 0.44$ to $\phi 2.00$ mm

Figure 9:
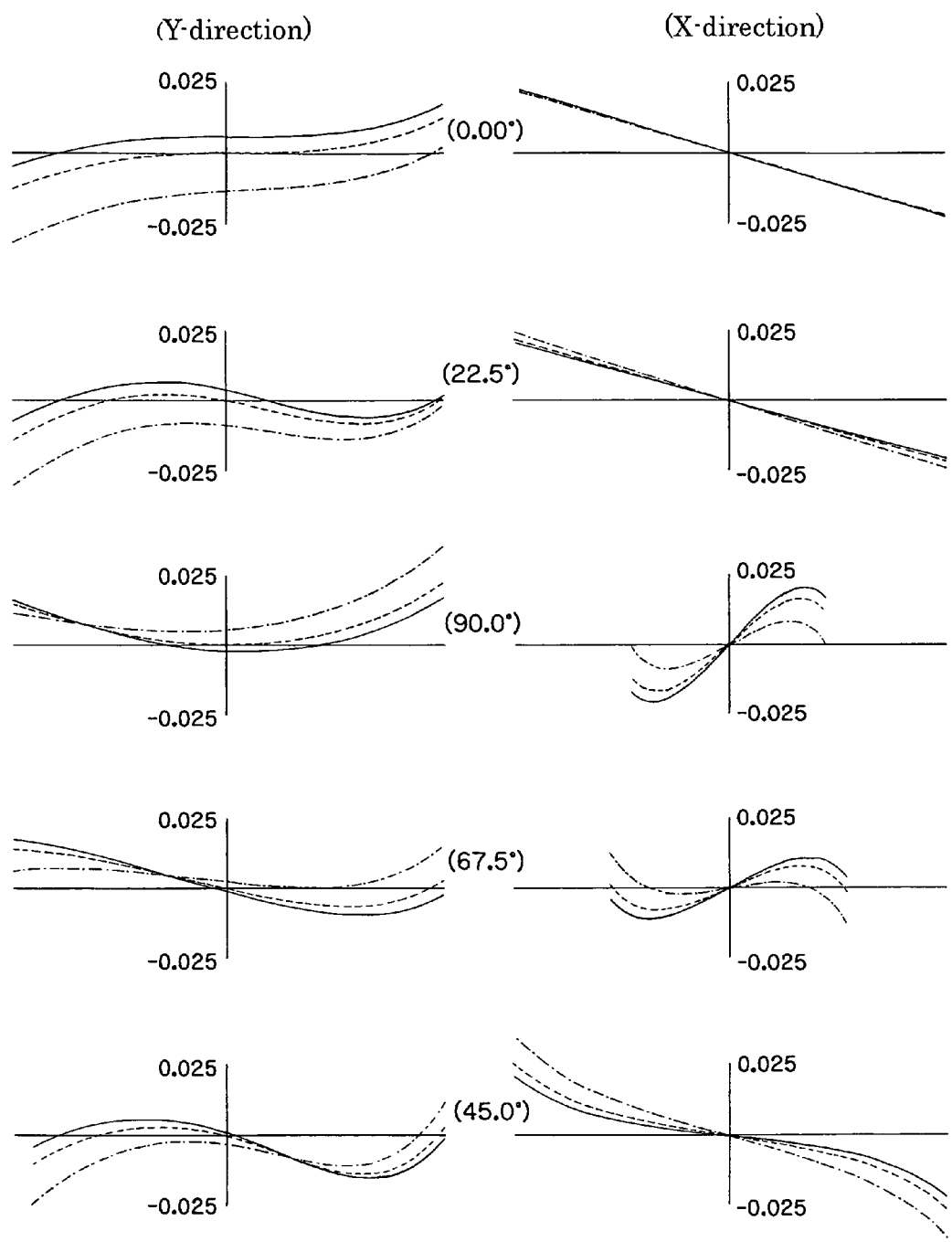
FIG. 9 is a transverse aberration diagram for Example 3.

FIG. 9 is a transverse aberration diagram, as in FIG. 3, for the optical system of this example.

Figure 10:
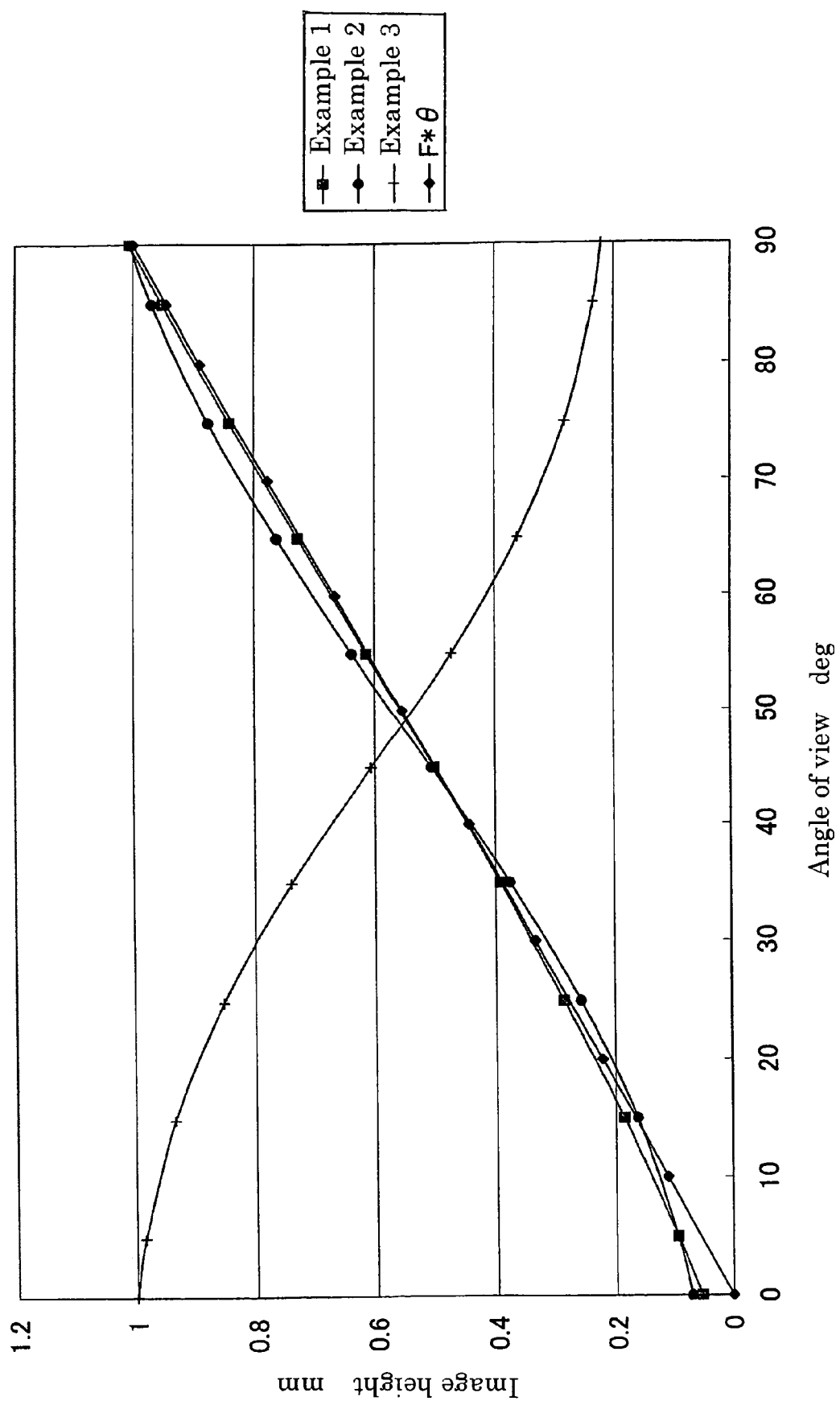
FIG. 10 is a diagram illustrative of vertical distortions of Examples 1-3.

FIG. 10 is representative of distortions for Examples 1, 2 and 3 in the vertical direction. More specifically, curves for Examples 1, 2 and 3 are obtained by plotting image heights (radial image heights from the center axis 1) at the image plane 30 with respect to the vertical incident angles of view of the optical systems according to Examples 1, 2 and 3. Note here that each angle of view is a vertical incident angle of view, as viewed from the center of curvature (origin) of the hemispherically curved object 100 with its center direction at 0° and its edge direction at 90°, and that is different from the angles of rays incident actually on the optical system. A curve shown by F*θ is indicative of the case in which the image height is proportional to the incident angle of view (IH∝f·θ where IH is an image height, f is a focal length and θ is an angle of view).

Enumerated below are the constructional parameters of Examples 1, 2 and 3 given above. In what follows, the acronyms "ASS", "ERFS" and "RE" stand for an aspheric surface, an extended rotation free-form surface and a reflecting surface, respectively.

EXAMPLE 1

| Surface No. | Radius of curvature | Surface Displacement separation and tilt | Refractive index | Abbe's No. |
|---|---|---|---|---|
| Object plane | 8.50 | (1) | | |
| 1 | ERFS[1] | (2) | 2.0033 | 28.3 |
| 2 | ERFS[2] (RE) | (3) | 2.0033 | 28.3 |
| 3 | ERFS[3] (RE) | (4) | 2.0033 | 28.3 |
| 4 | ERFS[4] | (5) | | |
| 5 | ∞(Stop) | (6) | | |
| 6 | −6.32 | (7) | 1.6294 | 58.6 |
| 7 | −1.53 | (8) | | |
| 8 | 3.49 | (9) | 1.6204 | 60.3 |
| 9 | −4.93 | (10) | | |
| Image plane | ∞ | (11) | | |

| ERFS[1] | |
|---|---|
| RY | 1.92 |
| θ | −43.48 |
| R | −0.75 |

| ERFS[2] | |
|---|---|
| RY | −4.04 |
| θ | −39.02 |
| R | 2.54 |
| $C_3$ | $6.6373 \times 10^{-3}$ |
| $C_4$ | $7.6697 \times 10^{-4}$ |

| ERFS[3] | |
|---|---|
| RY | 14.37 |
| θ | −45.87 |
| R | −2.52 |
| $C_3$ | $9.9554 \times 10^{-2}$ |
| $C_4$ | $3.8512 \times 10^{-3}$ |

| ERFS[4] | |
|---|---|
| RY | 3.47 |
| θ | −50.03 |
| R | −0.59 |
| $C_3$ | $-1.7743 \times 10^{-1}$ |
| $C_4$ | $-1.1463 \times 10^{-2}$ |

| Displacement and tilt (1) | | | | | |
|---|---|---|---|---|---|
| X | 0.00 | Y | 8.50 | Z | 0.00 |
| α | −90.00 | β | 0.00 | γ | 0.00 |

| Displacement and tilt (2) | | | | | |
|---|---|---|---|---|---|
| X | 0.00 | Y | −0.80 | Z | 0.00 |
| α | 0.00 | β | 0.00 | γ | 0.00 |

| Displacement and tilt (3) | | | | | |
|---|---|---|---|---|---|
| X | 0.00 | Y | −4.45 | Z | 0.00 |
| α | 0.00 | β | 0.00 | γ | 0.00 |

| Displacement and tilt (4) | | | | | |
|---|---|---|---|---|---|
| X | 0.00 | Y | −1.51 | Z | 0.00 |
| α | 0.00 | β | 0.00 | γ | 0.00 |

EXAMPLE 1-continued

| Displacement and tilt (5) | | | | | |
|---|---|---|---|---|---|
| X | 0.00 | Y | −5.07 | Z | 0.00 |
| α | 0.00 | β | 0.00 | γ | 0.00 |

| Displacement and tilt (6) | | | | | |
|---|---|---|---|---|---|
| X | 0.00 | Y | −7.13 | Z | 0.00 |
| α | −90.00 | β | 0.00 | γ | 0.00 |

| Displacement and tilt (7) | | | | | |
|---|---|---|---|---|---|
| X | 0.00 | Y | −7.66 | Z | 0.00 |
| α | −90.00 | β | 0.00 | γ | 0.00 |

| Displacement and tilt (8) | | | | | |
|---|---|---|---|---|---|
| X | 0.00 | Y | −8.59 | Z | 0.00 |
| α | −90.00 | β | 0.00 | γ | 0.00 |

| Displacement and tilt (9) | | | | | |
|---|---|---|---|---|---|
| X | 0.00 | Y | −8.74 | Z | 0.00 |
| α | −90.00 | β | 0.00 | γ | 0.00 |

| Displacement and tilt (10) | | | | | |
|---|---|---|---|---|---|
| X | 0.00 | Y | −9.67 | Z | 0.00 |
| α | −90.00 | β | 0.00 | γ | 0.00 |

| Displacement and tilt (11) | | | | | |
|---|---|---|---|---|---|
| X | 0.00 | Y | −11.74 | Z | 0.00 |
| α | −90.00 | β | 0.00 | γ | 0.00 |

EXAMPLE 2

| Surface No. | Radius of curvature | Surface Displacement separation and tilt | Refractive index | Abbe's No. |
|---|---|---|---|---|
| Object plane | 8.69 | (1) | | |
| 1 | ERFS[1] | (2) | 2.0033 | 28.3 |
| 2 | ERFS[2] (RE) | (3) | 2.0033 | 28.3 |
| 3 | ERFS[3] (RE) | (4) | 2.0033 | 28.3 |
| 4 | ERFS[4] | (5) | | |
| 5 | ∞(Stop) | (6) | | |
| 6 | −1.87 | (7) | 1.8830 | 40.7 |
| 7 | −1.36 | (8) | | |
| 8 | 2.29 | (9) | 1.8830 | 40.7 |
| 9 | ∞ | (10) | | |
| Image plane | ∞ | (11) | | |

| ERFS[1] | |
|---|---|
| RY | 4.49 |
| θ | −29.03 |
| R | −1.37 |
| $C_4$ | $-4.6687 \times 10^{-2}$ |

| ERFS[2] | |
|---|---|
| RY | −15.19 |
| θ | −62.20 |
| R | 5.06 |
| $C_3$ | $-6.5847 \times 10^{-4}$ |
| $C_4$ | $-1.6144 \times 10^{-3}$ |
| $C_5$ | $1.9526 \times 10^{-4}$ |

| ERFS[3] | |
|---|---|
| RY | 16.88 |
| θ | −106.81 |
| R | 4.60 |
| $C_3$ | $-2.3864 \times 10^{-2}$ |
| $C_4$ | $-1.7959 \times 10^{-3}$ |
| $C_5$ | $2.2822 \times 10^{-4}$ |

| ERFS[4] | |
|---|---|
| RY | 7.45 |
| θ | −144.87 |
| R | 1.46 |

EXAMPLE 2-continued

| | | | | | |
|---|---|---|---|---|---|
| | $C_3$ | | $-8.5413 \times 10^{-2}$ | | |
| | $C_4$ | | $1.4177 \times 10^{-3}$ | | |
| | $C_5$ | | $2.7441 \times 10^{-3}$ | | |

Displacement and tilt (1)

| X | 0.00 | Y | 8.69 | Z | 0.00 |
|---|---|---|---|---|---|
| α | −90.00 | β | 0.00 | γ | 0.00 |

Displacement and tilt (2)

| X | 0.00 | Y | 0.00 | Z | 0.00 |
|---|---|---|---|---|---|
| α | 0.00 | β | 0.00 | γ | 0.00 |

Displacement and tilt (3)

| X | 0.00 | Y | −5.45 | Z | 0.00 |
|---|---|---|---|---|---|
| α | 0.00 | β | 0.00 | γ | 0.00 |

Displacement and tilt (4)

| X | 0.00 | Y | −1.01 | Z | 0.00 |
|---|---|---|---|---|---|
| α | 0.00 | β | 0.00 | γ | 0.00 |

Displacement and tilt (5)

| X | 0.00 | Y | −4.82 | Z | 0.00 |
|---|---|---|---|---|---|
| α | 0.00 | β | 0.00 | γ | 0.00 |

Displacement and tilt (6)

| X | 0.00 | Y | −8.31 | Z | 0.00 |
|---|---|---|---|---|---|
| α | −90.00 | β | 0.00 | γ | 0.00 |

Displacement and tilt (7)

| X | 0.00 | Y | −8.47 | Z | 0.00 |
|---|---|---|---|---|---|
| α | −90.00 | β | 0.00 | γ | 0.00 |

Displacement and tilt (8)

| X | 0.00 | Y | −9.42 | Z | 0.00 |
|---|---|---|---|---|---|
| α | −90.00 | β | 0.00 | γ | 0.00 |

Displacement and tilt (9)

| X | 0.00 | Y | −9.58 | Z | 0.00 |
|---|---|---|---|---|---|
| α | −90.00 | β | 0.00 | γ | 0.00 |

Displacement and tilt (10)

| X | 0.00 | Y | −10.84 | Z | 0.00 |
|---|---|---|---|---|---|
| α | −90.00 | β | 0.00 | γ | 0.00 |

Displacement and tilt (11)

| X | 0.00 | Y | −11.83 | Z | 0.00 |
|---|---|---|---|---|---|
| α | −90.00 | β | 0.00 | γ | 0.00 |

EXAMPLE 3

| Surface No. | Radius of curvature | Surface Displacement separation and tilt | Refractive index | Abbe's No. |
|---|---|---|---|---|
| Object plane | 8.96 | (1) | | |
| 1 | ERFS[1] | (2) | 2.0033 | 28.3 |
| 2 | ERFS[2] (RE) | (3) | 2.0033 | 28.3 |
| 3 | ERFS[3] (RE) | (4) | 2.0033 | 28.3 |
| 4 | ASS[1] | (5) | | |
| 5 | ∞(Stop) | (6) | | |
| 6 | −1.78 | (7) | 1.8830 | 40.7 |
| 7 | −1.07 | (8) | | |
| 8 | 3.89 | (9) | 1.8830 | 40.7 |
| 9 | −9.07 | (10) | | |
| Image plane | ∞ | (11) | | |

ERFS[1]

| | |
|---|---|
| RY | 1.53 |
| θ | −44.61 |
| R | −3.58 |
| $C_4$ | 1.4335 |

EXAMPLE 3-continued

ERFS[2]

| | |
|---|---|
| RY | −3.36 |
| θ | −81.09 |
| R | −2.31 |
| $C_3$ | $5.7104 \times 10^{-3}$ |
| $C_4$ | $1.1068 \times 10^{-2}$ |
| $C_5$ | $1.0552 \times 10^{-3}$ |

ERFS[3]

| | |
|---|---|
| RY | 18.68 |
| θ | −97.17 |
| R | −0.71 |
| $C_3$ | $-2.9161 \times 10^{-2}$ |
| $C_4$ | $-5.8238 \times 10^{-2}$ |
| $C_5$ | $-1.3492 \times 10^{-2}$ |

ASS[1]

| | |
|---|---|
| R | $-0.12 \times 10^{-12}$ |
| k | $-2.2639 \times 10^{+33}$ |
| a | $4.4978 \times 10^{-1}$ |

Displacement and tilt (1)

| X | 0.00 | Y | 8.96 | Z | 0.00 |
|---|---|---|---|---|---|
| α | −90.00 | β | 0.00 | γ | 0.00 |

Displacement and tilt (2)

| X | 0.00 | Y | 3.50 | Z | 0.00 |
|---|---|---|---|---|---|
| α | 0.00 | β | 0.00 | γ | 0.00 |

Displacement and tilt (3)

| X | 0.00 | Y | 2.22 | Z | 0.00 |
|---|---|---|---|---|---|
| α | 0.00 | β | 0.00 | γ | 0.00 |

Displacement and tilt (4)

| X | 0.00 | Y | 5.37 | Z | 0.00 |
|---|---|---|---|---|---|
| α | 0.00 | β | 0.00 | γ | 0.00 |

Displacement and tilt (5)

| X | 0.00 | Y | 2.75 | Z | 0.00 |
|---|---|---|---|---|---|
| α | −90.00 | β | 0.00 | γ | 0.00 |

Displacement and tilt (6)

| X | 0.00 | Y | 2.51 | Z | 0.00 |
|---|---|---|---|---|---|
| α | −90.00 | β | 0.00 | γ | 0.00 |

Displacement and tilt (7)

| X | 0.00 | Y | 2.34 | Z | 0.00 |
|---|---|---|---|---|---|
| α | −90.00 | β | 0.00 | γ | 0.00 |

Displacement and tilt (8)

| X | 0.00 | Y | 1.53 | Z | 0.00 |
|---|---|---|---|---|---|
| α | −90.00 | β | 0.00 | γ | 0.00 |

Displacement and tilt (9)

| X | 0.00 | Y | 1.37 | Z | 0.00 |
|---|---|---|---|---|---|
| α | −90.00 | β | 0.00 | γ | 0.00 |

Displacement and tilt (10)

| X | 0.00 | Y | 0.72 | Z | 0.00 |
|---|---|---|---|---|---|
| α | −90.00 | β | 0.00 | γ | 0.00 |

Displacement and tilt (11)

| X | 0.00 | Y | −0.98 | Z | 0.00 |
|---|---|---|---|---|---|
| α | −90.00 | β | 0.00 | γ | 0.00 |

Figure 11:
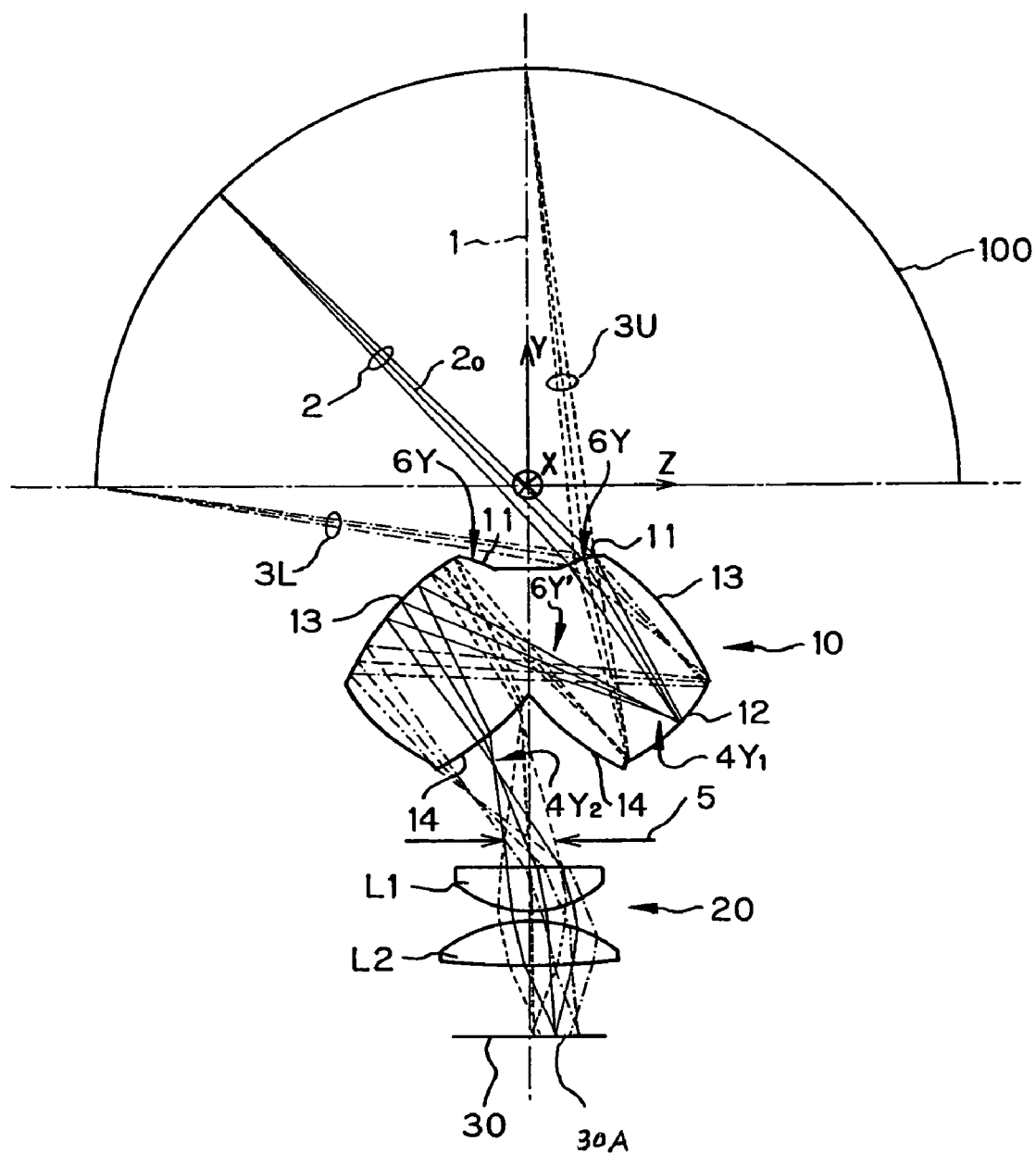
FIG. 11 is a sectional view of the optical system of Example 4 according to the invention, as taken along its center axis.
Figure 12:
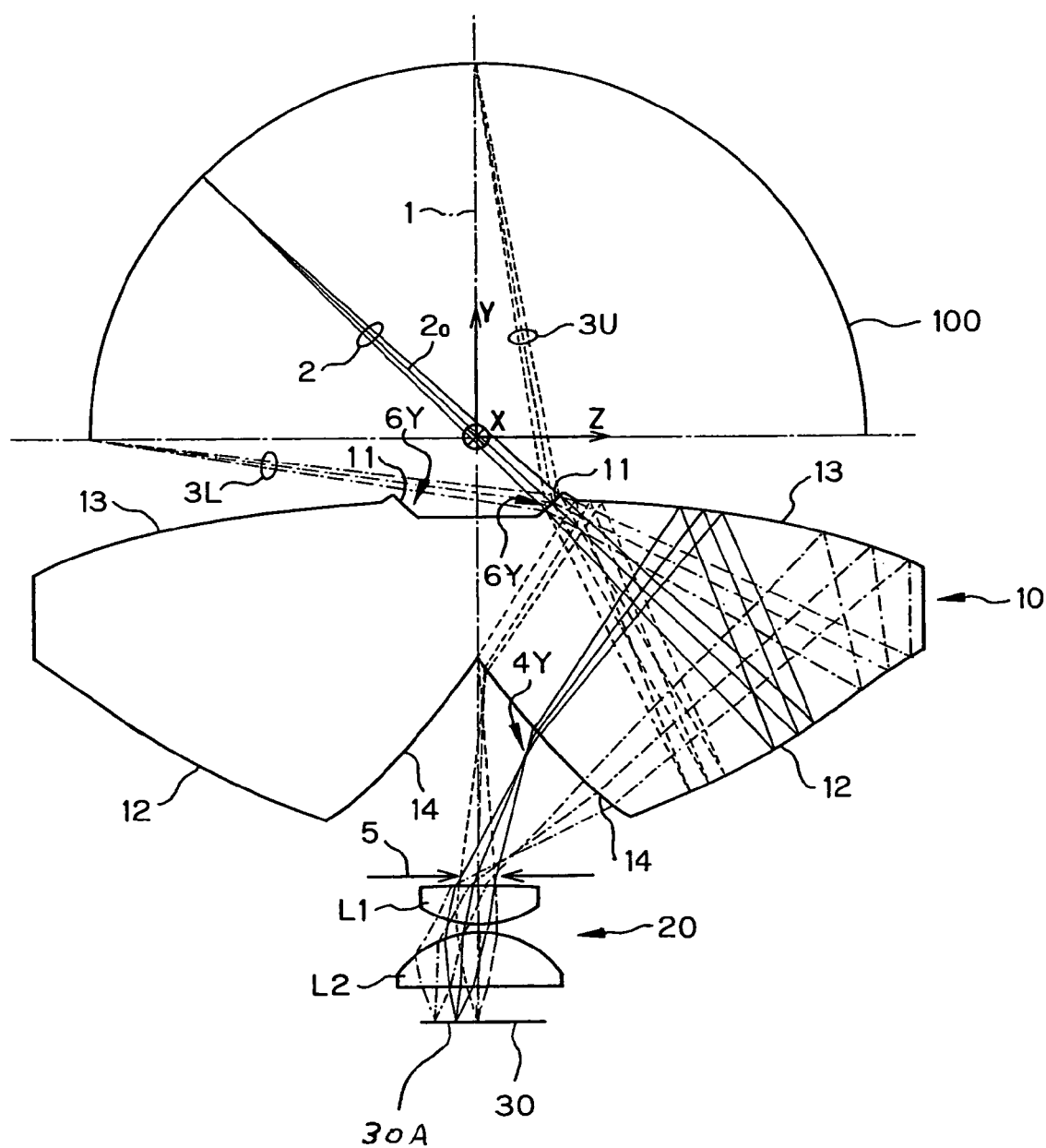
FIG. 12 is a sectional view of the optical system of Example 5 according to the invention, as taken along its center axis.

Further examples of the invention are illustrated in FIGS. 11 and 12. However, no constructional parameters of these further examples are given.

FIG. 11 is illustrative, in section, of the optical system of Example 4, as taken along its center axis (rotationally symmetric axis) 1. This example is a modification to Example 1, in which the first transmitting surface 11 is located in opposition to a light beam 2 coming from a curved object 100 with the center axis 1 between them.

The optical system of this example is made up of a front unit 10 that is rotationally symmetric about the center axis 1, a rear unit 20 that is rotationally symmetric about the center axis 1 and an aperture 5 located coaxially with the center axis 1 between the front unit 10 and the rear unit 20. A light beam 2 coming from the hemispherically curved object 100 with the origin as the center of curvature travels through the front unit 10 and the rear unit 20 in this order, forming an image 30A at a position of an image plane 30 vertical to, and off, the center axis 1. With the center axis 1 set perpendicularly (vertically), there is an annular image 30A formed on the image plane 30, which has a full 360°-direction (full-panoramic) angle of view along the circular edge of the hemispherically curved object 100, with the center of the hemispherically curved object 100 lying in the center direction of the image and the edge line of the hemispherically curved object becoming an outer circle.

The front unit 10 includes a resin or other transparent medium that is rotationally symmetric about the center axis 1 and has a refractive index greater than 1, and includes two internal reflecting surfaces 12, 13 and two transmitting (entrance and exit) surfaces 11, 14. The internal reflecting surfaces 12, 13 and the transmitting surfaces 11, 14 are each of rotationally symmetric shape about the center axis 1. The rear unit 20 is specifically built up of a lens system composed of two lenses L1 and L2, each rotationally symmetric about the center axis 1, and having positive power.

The transparent medium of the front unit 10 is made up of a first transmitting surface 11, a first reflecting surface 12, a second reflecting surface 13 and a second transmitting surface 14. The first transmitting surface 11 is located on a side on which the light beam 2 from the curved object 100 is incident with the center axis 1 between them. The first reflecting surface 12 is located on the same side as the first transmitting surface 11 with respect to the center axis 1 and nearer to the image plane 30 than the first transmitting surface 11. The second reflecting surface 13 is located in opposition to the first transmitting surface 11 with the center axis 1 between them, and in opposition to the image plane 30 with respect to the first reflecting surface 12. The second transmitting surface 14 is located in opposition to the first transmitting surface 11 and nearer to the image plane 30 side than to the second reflecting surface 13.

The light beam 2 coming from the curved object 100 enters the transparent medium via the first transmitting surface 11, and arrives at the first reflecting surface 12 located on the same side as the first transmitting surface 11 with respect to the center axis 1, at which it is reflected away from the image plane 30. Then, the reflected light beam arrives at the second reflecting surface 13 located in opposition to the first transmitting surface 11 with respect to the center axis 1, at which it is reflected toward the image plane 30 side, leaving the transparent medium via the second transmitting surface 14. The transmitted light enters the rear unit 20 via the stop-forming round aperture 5 located coaxially with the center axis 1 between the front unit 10 and the rear unit 20 having positive power, forming an image 30A at a radially given position of the image plane 30 off the center axis 1. In this case, at least one of the first transmitting surface 11, the first reflecting surface 12, the second reflecting surface 13 and the second transmitting surface 14 is made up of an extended rotation free-form surface, but at least one of the at least one extended rotation free-form surface is a reflecting surface.

With the center axis 1 passing through the center of the hemispherically curved object 100, the center light beam 2 coming from a position of the curved object 100 in a direction having an elevation angle of 45° as viewed from the center of curvature of the curved object 100 is refracted through the first transmitting surface 11 that is the entrance surface, entering the transparent medium of the front unit 10. The transmitted light beam is reflected at the first reflecting surface 12 and the second reflecting surface 13 in this order, and then refracted through the second transmitting surface 14, leaving the transparent medium of the front unit 10. Finally, the transmitted light beam is incident on the rear unit 20 via the aperture 5, forming an image 30A at a radially given position of the image plane 30 off the center axis 1.

In the optical system of this example, the aperture (stop) 5 located between the front unit 10 and the rear unit 20 is once projected onto the object side to form an image 6Y' in the meridional section, and that image is again back projected to form an entrance pupil 6Y in the meridional section, which lies near the first transmitting surface 11 of the front unit 10. In the sagittal section, on the other hand, two images are formed on the center axis 1 (rotationally symmetric axis) 1 while an entrance pupil is formed on that center axis 1.

In addition, in the optical system of this example, light beams 2, 3U and 3L coming from the hemispherically curved object 100 via the entrance pupil 6Y (3U is a light beam coming from the center of the hemispherically curved object 100 and 3L is a light beam coming from the circular edge of the hemispherically curved object 100) form an image once at a position $4Y_1$ near the first reflecting surface 12 in a section including the center axis 1 (the meridional section: FIG. 11), and form an image again at a position $4Y_2$ on the stop 5 side of the second transmitting surface 14.

FIG. 12 is illustrative, in section, of the optical system of Example 5, as taken along its center axis (rotationally symmetric axis) 1. This example is a modification to Example 2, in which the first transmitting surface 11 is located in opposition to a light beam 2 coming from a curved object 100 with the center axis 1 between them.

The optical system of this example is made up of a front unit 10 that is rotationally symmetric about the center axis 1, a rear unit 20 that is rotationally symmetric about the center axis 1 and an aperture 5 located coaxially with the center axis 1 between the front unit 10 and the rear unit 20. A light beam 2 coming from the hemispherically curved object 100 with the origin as the center of curvature travels through the front unit 10 and the rear unit 20 in this order, forming an image 30A at a position of an image plane 30 vertical to, and off, the center axis 1. With the center axis 1 set perpendicularly (vertically), there is an annular image 30A formed on the image plane 30, which has a full 360°-direction (full-panoramic) angle of view along the circular edge of the hemispherically curved object 100 with the center of the hemispherically curved object 100 lying in the center direction of the image 30A and the edge line of the hemispherically curved object becoming an outer circle.

The front unit 10 includes a resin or other transparent medium that is rotationally symmetric about the center axis 1 and has a refractive index greater than 1, and includes two internal reflecting surfaces 12, 13 and two transmitting (entrance and exit) surfaces 11, 14. The internal reflecting surfaces 12, 13 and the transmitting surfaces 11, 14 are each of rotationally symmetric shape about the center axis 1. The rear unit 20 is specifically built up of a lens system composed of two lenses L1 and L2, each rotationally symmetric about the center axis 1, and having positive power.

The transparent medium of the front unit 10 is made up of the first transmitting surface 11, the first reflecting surface 12, the second reflecting surface 13 and the second transmitting surface 14. The first transmitting surface 11 is located in opposition to a side on which the light beam 2 from the curved object 100 is incident with the center axis 1 between them. The first reflecting surface 12 is located on the same side as the first transmitting surface 11 with respect to the center axis 1 and nearer to the image plane 30 than the first transmitting surface 11. The second reflecting surface 13 is located on the same side as the first reflecting surface 12 with respect to the center axis 1, and in opposition to the image plane 30 with respect to the first reflecting surface 12. The second transmitting surface 14 is located on the same side as the first transmitting surface 11, the first reflecting surface 12 and the second reflecting surface 13 and nearer to the image plane 30 than the second reflecting surface 13.

The light beam 2 coming from the curved object 100 enters the transparent medium via the first transmitting surface 11, and arrives at the first reflecting surface 12 located on the same side as the first transmitting surface 11 with respect to the center axis 1, at which it is reflected away from the image plane 30. Then, the reflected light beam arrives at the second reflecting surface 13 located on the same side as the first reflecting surface 12 with respect to the center axis 1, at which it is reflected toward the image plane 30 side, leaving the transparent medium via the second transmitting surface 14. The transmitted light enters the rear unit 20 via the stop-forming round aperture 5 located coaxially with the center axis 1 between the front unit 10 and the rear unit 20 having positive power, forming an image 30A at a radially given position of the image plane 30 off the center axis 1. In this case, at least one of the first transmitting surface 11, the first reflecting surface 12, the second reflecting surface 13 and the second transmitting surface 14 is made up of an extended rotation free-form surface, but at least one of the at least one extended rotation free-form surface is a reflecting surface.

With the center axis 1 passing through the center of the hemispherically curved object 100, the center light beam 2 coming from a position of the curved object 100 in a direction having an elevation angle of 45°, as viewed from the center of curvature of the curved object 100, is refracted through the first transmitting surface 11 that is the entrance surface, entering the transparent medium of the front unit 10. The transmitted light beam is reflected at the first reflecting surface 12 and the second reflecting surface 13 in this order, and then refracted through the second transmitting surface 14, leaving the transparent medium of the front unit 10. Finally, the transmitted light beam is incident on the rear unit 20 via the aperture 5, forming an image 30A at a radially given position of the image plane 30 off the center axis 1.

In the optical system of this example, the aperture (stop) 5 located between the front unit 10 and the rear unit 20 is projected onto the object side to form an entrance pupil 6Y in the meridional section, which lies near the first transmitting surface 11 of the front unit 10. In the sagittal section, on the other hand, a single image is formed on the center axis (rotationally symmetric axis) 1 to form an entrance pupil on the center axis 1.

In addition, in the optical system of this example, light beams 2, 3U and 3L coming from the hemispherically curved object 100 via the entrance pupil 6Y (3U is a light beam coming from the center of the hemispherically curved object 100 and 3L is a light beam coming from the circular edge of the hemispherically curved object 100) form an image 4Y once in a section including the center axis 1 (the meridional section: FIG. 12), which lies near the first reflecting surface 12.

In Examples 1, 2, 3 and 4 described above, each of the reflecting and refracting surfaces of the front unit 10 is defined by an extended rotation free-form surface that is formed by rotation about the rotationally symmetric axis 1 of a line segment of any arbitrary shape and has no vertex on the rotationally symmetric axis 1; however, that surface could easily be replaced by any desired curved surface.

It is also understood that if the transparent medium that forms the front unit 10 according to the invention and is rotationally symmetric about the center axis 1 is used as such, it is then possible to take or project images having a full 360°-direction angle of view; however, if that transparent medium is bisected, trisected, ⅔-sected or the like on a section including the center axis 1, it is then possible to take or project images having angles of view of 180°, 120°, 240° or the like about the center axis 1.

In the numerical examples given above, the image height is set at 1 m; however, any desired image height could be set by multiplication with a certain factor. If the radius of the hemispherically curved object 100 is arbitrarily changed, focusing could be implemented by shifting the image plane 30 in the direction of the center axis 1 or moving a part of the rear unit 20.

Figure 13A:
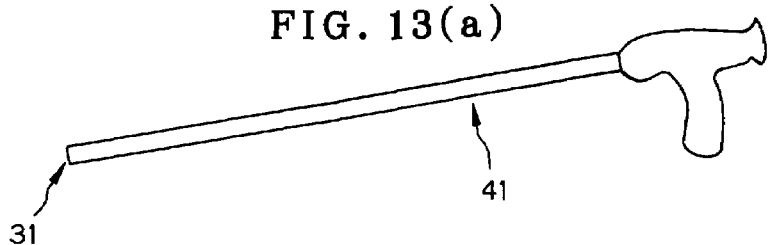
FIG. 13 is illustrative of an embodiment wherein the panoramic taking optical system of the invention is used as a taking optical system attached to the endmost tip of an endoscope.
Figure 13B:
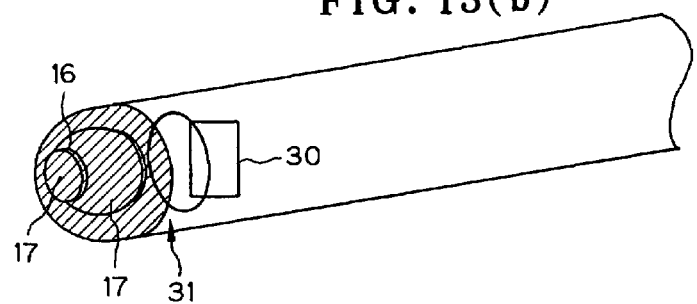
Figure 13C:
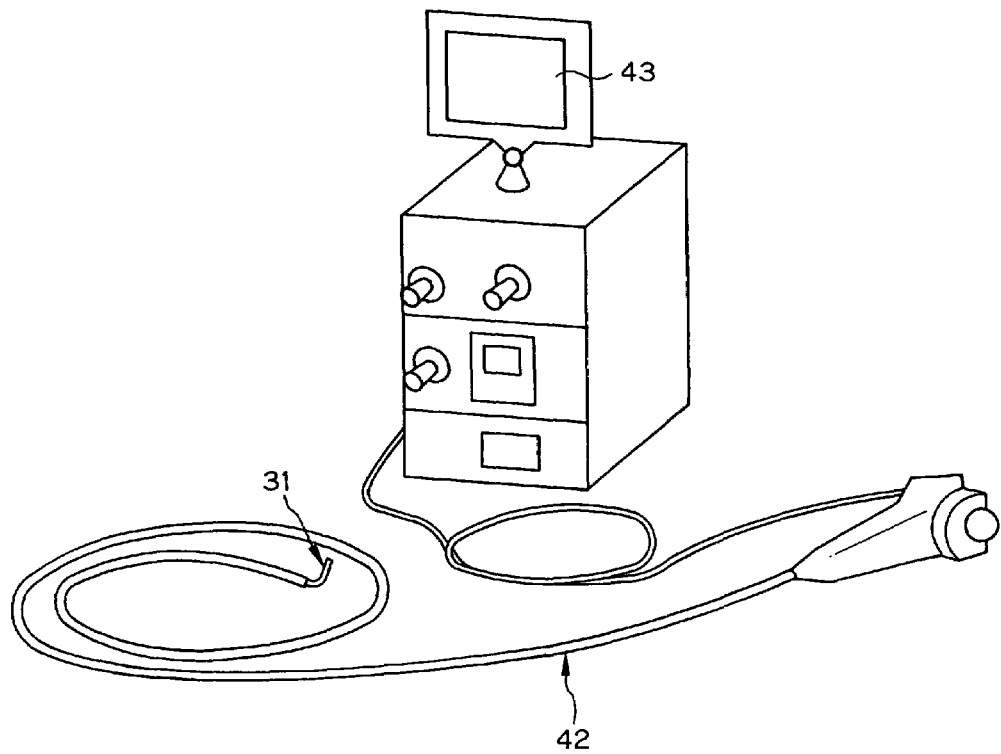

Specific examples of the optical system of the invention applied in the form of a panoramic taking optical system 31 or panoramic projection optical system 32 are now explained. FIG. 13 is generally illustrative of an example of the panoramic taking optical system 31 of the invention used as a taking optical system attached to the endmost portion of an endoscope. More specifically, FIG. 13(a) is illustrative of the panoramic taking optical system 31 of the invention that is attached to the endmost portion 31 of a hard endoscope 41 to take and view a full 360°-direction image, and FIG. 13(b) is illustrative, in schematic, of that endmost portion. Around the entrance surface 11 of the front unit 10 in the panoramic taking optical system 31, there is located a flare stop 17 including a casing having a slit aperture 16 that extends in a circumferential direction thereby preventing incidence of flare light. FIG. 13(c) is illustrative of an embodiment in which the inventive panoramic taking optical system 31 is likewise attached to the endmost portion of a soft electronic endoscope 42, so that a taken image is shown on a display device 43 with distortions subjected to image processing for correction.

Figure 14:
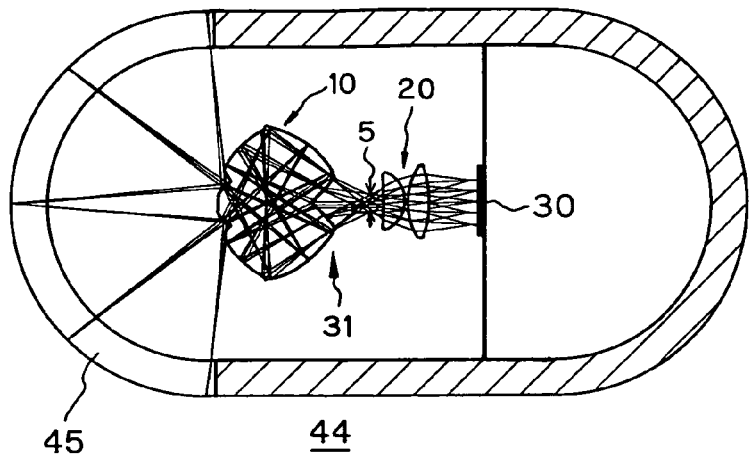
FIG. 14 is illustrative of an embodiment wherein the panoramic taking optical system of the invention is used as a taking optical system in a capsule endoscope.

FIG. 14 is illustrative of an example of the panoramic taking optical system 31 of the invention used as a taking optical system a capsule endoscope 44. A full 360°-direction panoramic image of the intestinal wall or the like in close contact with a hemispherical window 45 at the endmost portion of the capsule endoscope 44 is taken for observation with the panoramic taking optical system 31.

Figure 15:
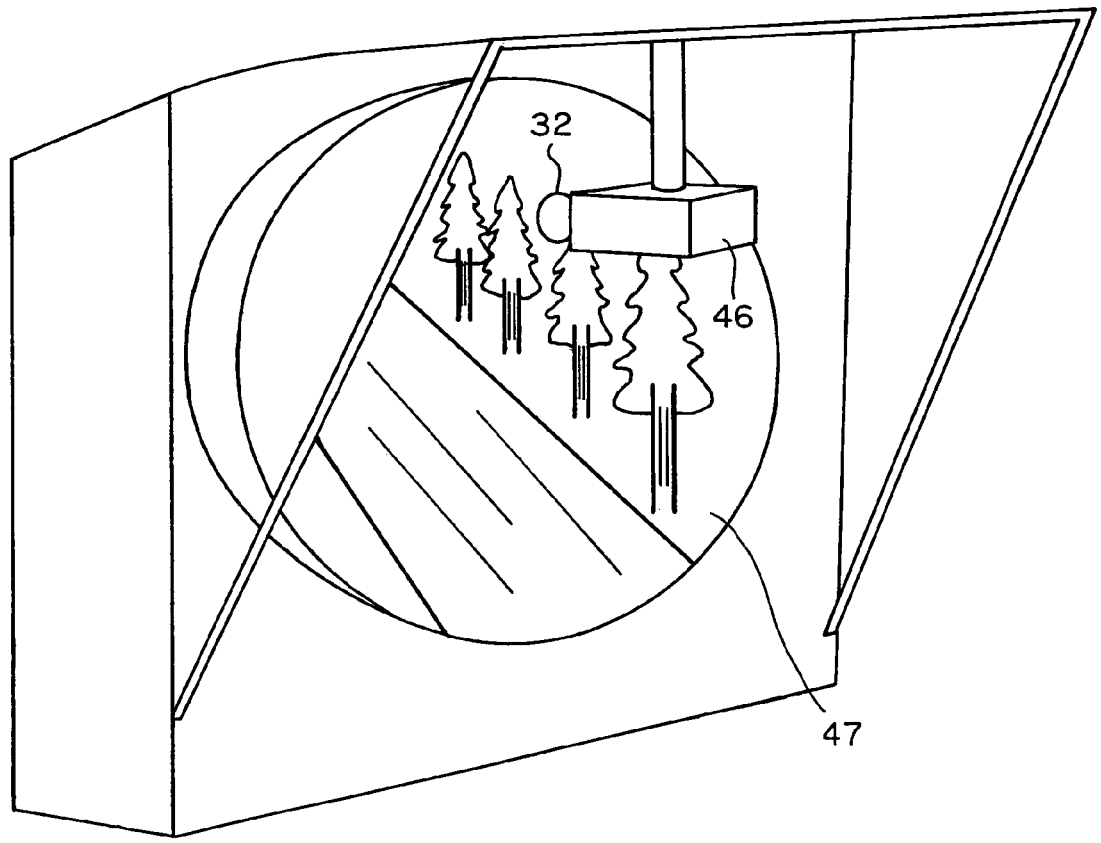
FIG. 15 is illustrative of an embodiment wherein the panoramic projection optical system of the invention is used as a projection optical system in a projector.

FIG. 15 is illustrative of an example of a projector 46 in which the panoramic projection optical system 32 of the invention is used as its projection optical system. A panoramic image is displayed on a display device located on the image plane of the system 32, so that a full 360°-direction image is projected and displayed on a full 360°-direction screen 47 through the panoramic optical system 32.

The invention claimed is:
1. An optical system comprising:
a front unit formed of a transparent medium which is rotationally symmetric about a center axis;
an aperture located coaxially with the center axis; and
a rear unit which is rotationally symmetric about the center axis and has positive power;
wherein said front unit includes two entrance pupils symmetrically disposed about the center axis in a meridional section, a first transmitting surface through which a light beam from an object point is incident on said front unit, a first reflecting surface for reflecting a light beam after transmission through said first transmitting surface, a second reflecting surface for reflecting a light beam after reflection at said first reflecting surface, and a second transmitting surface through which a light beam leaves said transparent medium after reflection at said second reflecting surface; and wherein a light beam coming from a hemispherical object surface, which is rotationally symmetric about the center axis, travels through said front unit and said rear unit in this order, forming a rotationally symmetric, annular image of the hemispherical object surface on an image plane of the system, at points away from the center axis.

2. The optical system according to claim 1, wherein at least one of the first reflecting surface and the second reflecting surface is of a rotationally symmetric shape defined by rotation about the center axis of a line segment of any arbitrary shape including an odd-number degree term.

3. The optical system according to claim 1, wherein said front unit further includes an entrance pupil in a sagittal section, and one of the entrance pupils in the meridional section and the entrance pupil in the sagittal section differ in position.

4. The optical system according to claim 3, wherein the one of the entrance pupils in the meridional section lies near the first transmitting surface in the optical system, and the entrance pupil in the sagittal section lies near the center axis.

5. The optical system according to claim 1, wherein a number of stop images formed upon projection of said aperture in an opposite direction to a direction of incidence of said light beam is the same, or differs by one, in the meridional section and a sagittal section.

6. The optical system according to claim 1, wherein a one-way flare stop is situated in a meridional section and near one of the entrance pupils, the one-way flare stop being adapted to limit said aperture in said meridional section alone.

7. The optical system according to claim 1, which satisfies the following condition (1):

$$-60° < \Theta_1 < -20° \quad (1)$$

where $\Theta_1$ is an angle of a tangential plane with respect to the center axis at a position of said first transmitting surface, on which a center ray of a center light beam from a center of an angle of view is incident.

8. The optical system according to claim 1, which satisfies the following condition (2):

$$1.2 < H_1/H_2 \quad (2)$$

where $H_1$ is a height of said front unit from a top end to a bottom end perpendicularly to the image plane, and $H_2$ is a height from the top end of said front unit to a position of said first transmitting surface, on which a center ray of a center beam from a center of an angle of view is incident.

9. The optical system according to claim 1, which satisfies the following condition (3):

$$5 < |A/B| \quad (3)$$

where A is an optical path length of a position of one of the entrance pupils in the meridional section to a position of said aperture, and B is an optical path length from the position of the one of the entrance pupils in the meridional section to said first transmitting surface of said front unit.

10. The optical system according to claim 1, wherein at least one of the first reflecting surface and the second reflecting surface is of a rotationally symmetric shape defined by rotation about the center axis of a line segment of any arbitrary shape having no symmetric plane.

11. The optical system of claim 1, wherein the optical system is adapted to project a planar image onto a spherical image surface.

* * * * *